Jan. 7, 1936.  A. PROCOFIEFF-SEVERSKY  2,027,349
RANGE FINDING AND FLIGHT DIRECTING APPARATUS FOR USE IN AIRCRAFT
Original Filed June 18, 1923  24 Sheets-Sheet 1

INVENTOR
Alexander Procofieff Seversky
BY
Emery Booth Janney & Varney
ATTORNEY

Jan. 7, 1936.   A. PROCOFIEFF-SEVERSKY   2,027,349
RANGE FINDING AND FLIGHT DIRECTING APPARATUS FOR USE IN AIRCRAFT
Original Filed June 18, 1923   24 Sheets-Sheet 2

INVENTOR
Alexander Procofieff Seversky
BY
Emery Booth Janney & Varney
ATTORNEY

Jan. 7, 1936.   A. PROCOFIEFF-SEVERSKY   2,027,349
RANGE FINDING AND FLIGHT DIRECTING APPARATUS FOR USE IN AIRCRAFT
Original Filed June 18, 1923   24 Sheets-Sheet 3

INVENTOR
Alexander Procofieff Seversky
BY
Emery Booth Janney & Garney
ATTORNEY

Jan. 7, 1936.   A. PROCOFIEFF-SEVERSKY   2,027,349
RANGE FINDING AND FLIGHT DIRECTING APPARATUS FOR USE IN AIRCRAFT
Original Filed June 18, 1923   24 Sheets-Sheet 7

INVENTOR
Alexander Procofieff Seversky
BY
ATTORNEY

Jan. 7, 1936.   A. PROCOFIEFF-SEVERSKY   2,027,349
RANGE FINDING AND FLIGHT DIRECTING APPARATUS FOR USE IN AIRCRAFT
Original Filed June 18, 1923   24 Sheets-Sheet 10

INVENTOR
Alexander Procofieff Seversky
BY
*Emery Booth Janney & Varney*
ATTORNEY Jan. 7, 1936.  A. PROCOFIEFF-SEVERSKY  2,027,349
RANGE FINDING AND FLIGHT DIRECTING APPARATUS FOR USE IN AIRCRAFT
Original Filed June 18, 1923  24 Sheets-Sheet 11

INVENTOR
Alexander Procofieff Seversky
BY
Emery Booth Janney & Varney
ATTORNEY

Jan. 7, 1936.  A. PROCOFIEFF-SEVERSKY  2,027,349
RANGE FINDING AND FLIGHT DIRECTING APPARATUS FOR USE IN AIRCRAFT
Original Filed June 18, 1923    24 Sheets-Sheet 14

INVENTOR
Alexander Procofieff Seversky
ATTORNEY

Jan. 7, 1936.   A. PROCOFIEFF-SEVERSKY   2,027,349
RANGE FINDING AND FLIGHT DIRECTING APPARATUS FOR USE IN AIRCRAFT
Original Filed June 18, 1923   24 Sheets-Sheet 16

INVENTOR
Alexander Procofieff Seversky
BY
ATTORNEY

Jan. 7, 1936.  A. PROCOFIEFF-SEVERSKY  2,027,349
RANGE FINDING AND FLIGHT DIRECTING APPARATUS FOR USE IN AIRCRAFT
Original Filed June 18, 1923  24 Sheets-Sheet 18

INVENTOR
Alexander Procofieff Seversky
BY
ATTORNEY

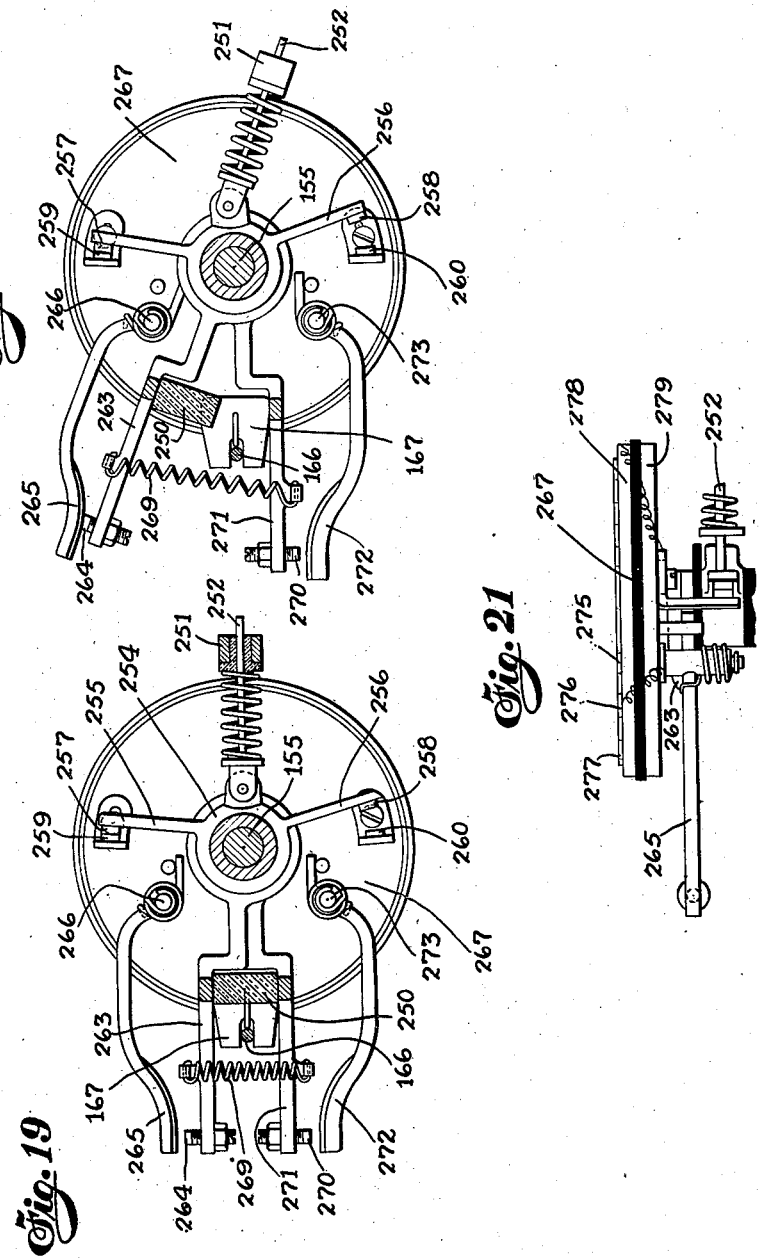

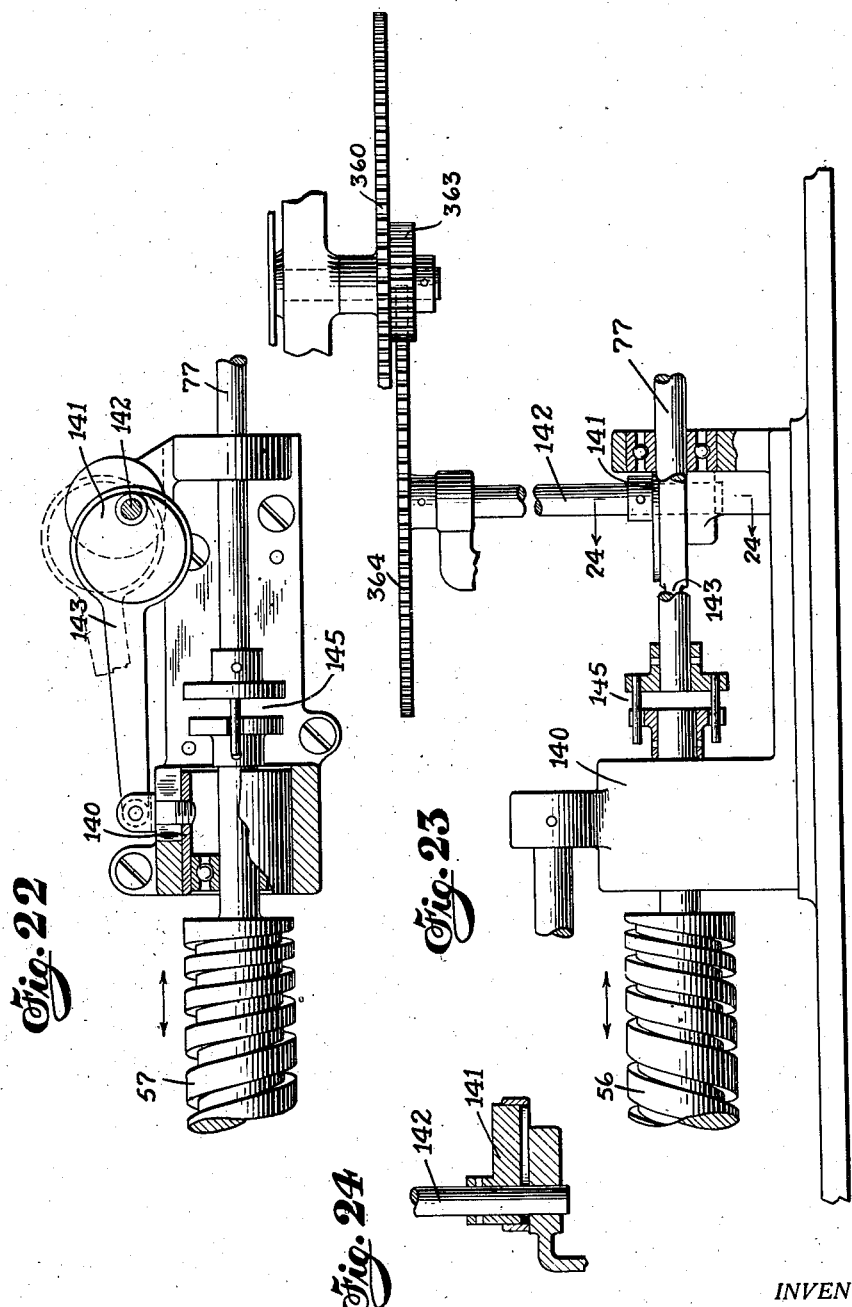

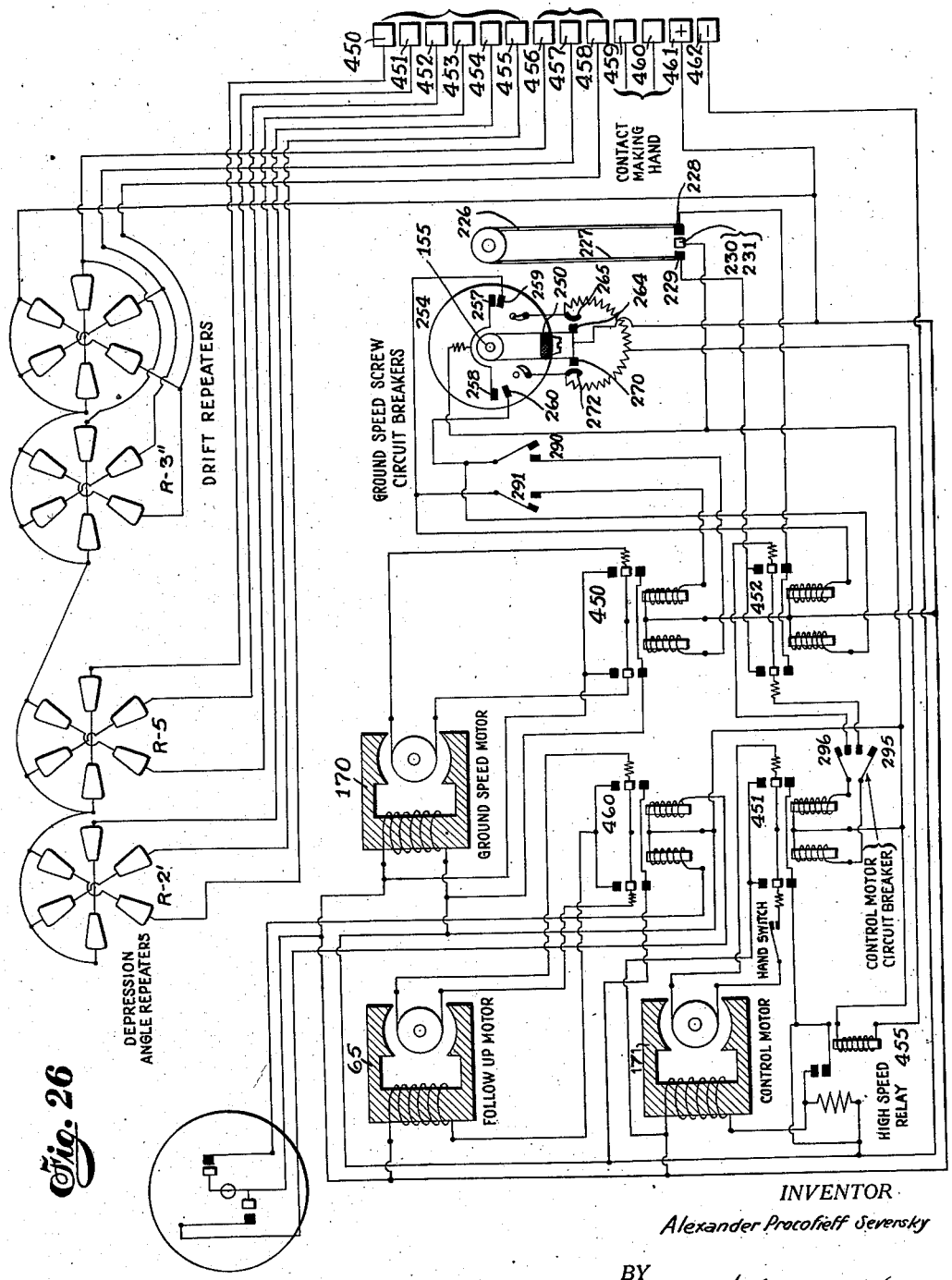

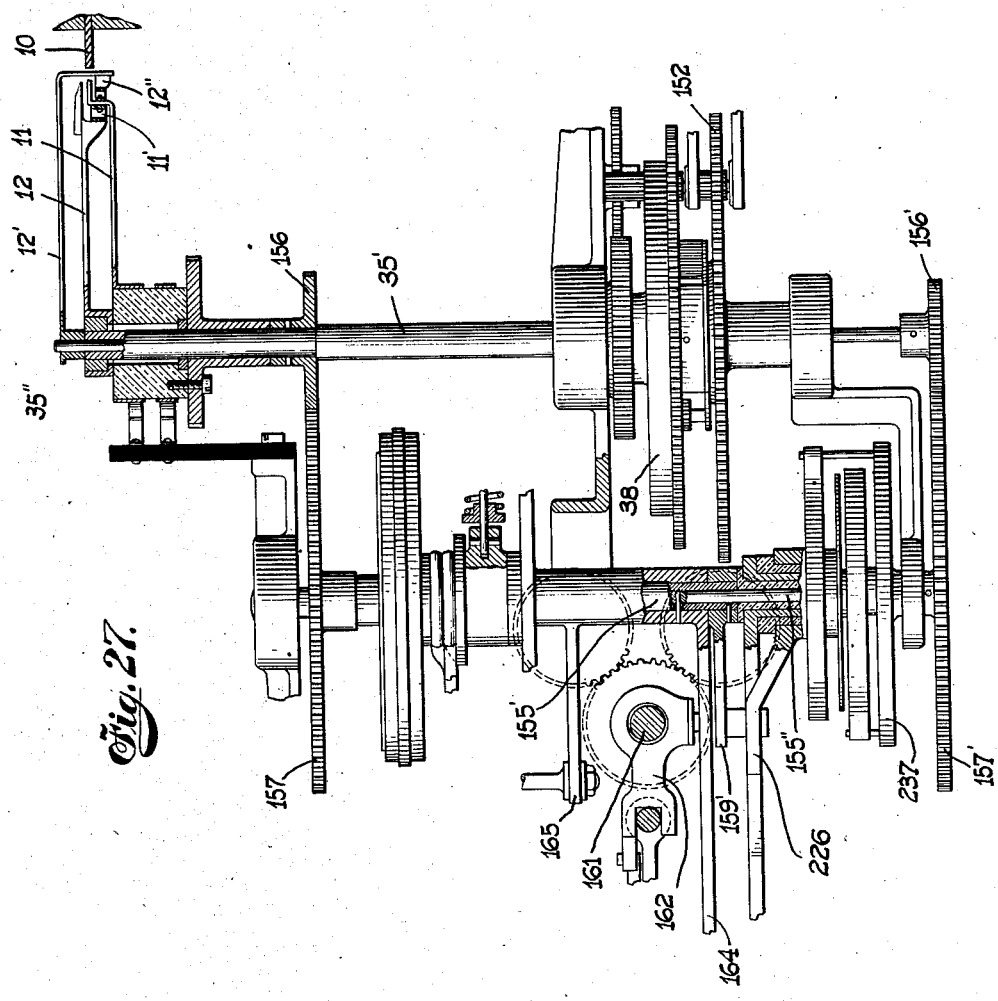

Jan. 7, 1936. A. PROCOFIEFF-SEVERSKY 2,027,349
RANGE FINDING AND FLIGHT DIRECTING APPARATUS FOR USE IN AIRCRAFT
Original Filed June 18, 1923 24 Sheets-Sheet 23

Inventor
Alexander Procofieff Seversky
By Attorney
Emery Booth Janney & Varney

Patented Jan. 7, 1936

2,027,349

UNITED STATES PATENT OFFICE 2,027,349

RANGE FINDING AND FLIGHT DIRECTING APPARATUS FOR USE IN AIRCRAFT

Alexander Procofieff-Seversky, New York, N. Y., assignor to Seversky Aero Corporation Application June 18, 1923, Serial No. 645,980
Renewed September 21, 1934

64 Claims. (Cl. 33—46.5)

The present invention relates to range finding apparatus and more particularly to apparatus for determining the variable factors for fire control when there is relative motion between the missile projector and the target.

The invention has been developed in connection with apparatus for use in directing aerial navigation and in connection with the art of dropping bombs from movable aircraft upon a fixed or movable target and for purposes of illustration will be more particularly described as embodied in apparatus to be carried by an aircraft for controlling flight and bomb dropping. Such description is merely illustrative and does not define the limits of the invention. Many features of the invention are capable of embodiment in various other devices.

The accurate dropping of bombs from an aircraft high in the air upon a fixed or moving target below is practically impossible if reliance is to be had upon unaided observations and the sense of direction, and upon the judgment of the observer to determine what course of flight should be pursued, and at what moment the bomb should be dropped to reach the target. Several factors contribute to the difficulty of obtaining accuracy. In the first place, it is impossible at any substantial altitude to determine from mere visual observation when an aircraft is vertically over a target. In the second place, it is impossible accurately to estimate how far from the vertical the bomb will be carried by the motion of the craft and by the wind, or how far the moving target will travel during the fall of the bomb.

The difficulty of obtaining accuracy will perhaps be more obvious when it is considered that the time of falling of a bomb may be, for example, half a minute during which time the bomb would be carried in the direction of the movement of the aircraft a distance substantially proportional to the speed of the craft, and the target, as for example a train, might move half a mile or more.

The path of the bomb during its fall will depend principally upon it initial velocity when released but will be substantially affected, especially if dropped from a great altitude, by the resistance of the air and by the wind. The initial velocity of a bomb as dropped from an aircraft is ordinarily dependent merely upon and equal to the speed of the craft relative to the ground. The movement of the craft relative to the ground is in turn dependent upon the speed of the craft relative to the air and the direction and velocity of the wind. The effect of the wind may be divided into two components, one along the line of flight and the other at right angles thereto. The second component will cause a lateral drifting of the craft and will make it necessary to direct the craft at an angle to the desired direction of actual travel, this angle being termed, for convenience, of description, the angle of drift and depending upon the speed of the craft relative to the air, or "air speed", and upon the velocity and direction of the wind. The effect of the air resistance upon the path of fall will depend upon the type of bomb, or the ratio of the resistance of the air as the bomb falls to its weight. This property of the bomb may be expressed as a constant known as the "terminal velocity" of the bomb which is the maximum volocity which the particular bomb would attain in falling from an infinite height to sea level in air under standard conditions. The actual terminal velocity of a bomb obviously depends in part upon the condition of the air to be encountered as to humidity, temperature, barometric pressure and upon the altitude, at the time and place of release and if the greatest possible accuracy is desired the terminal velocity constant should be corrected to correspond to the existing conditions.

The resistance of the air conveniently may be considered as affecting the path of the bomb in two ways. First, it retards vertical falling, and second it opposes movement in a horizontal direction due to the initial horizontal velocity. The first effect prolongs the time of flight, thus extending the time during which the bomb is subject to the original horizontal momentum. If we disregard other influences this effect may be considered as increasing the distance travelled in a horizontal direction. The second effect obviously reduces this horizontal distance.

The latter effect will be considered herein in connection with the wind. The effect of the wind for convenience may be considered as divided into two components, one affecting the extent of travel of the bomb in the direction of travel of the craft relative to the ground, the other component affecting the lateral travel of the bomb, that is to say, its movement in a direction at right angles to the line of flight relative to the ground.

The separate consideration of the effect of wind and of the initial velocity and air resistance in the direction of the line of flight may be avoided by considering the initial horizontal velocity of the bomb relative to the air in the direction of travel of the craft. This initial velocity will obviously be equal to the air speed of the craft multiplied by the cosine of the angle of drift. This factor is easily obtained and its effect is easily calculated.

For bomb dropping operations it is convenient to know the "range angle"—i. e., the angle between the vertical and a line connecting the points where the bomb begins and ends its fall. The bombardier knowing the range angle endeavors to release a bomb when the angle of depression of the line of sight to the target corresponds to the range angle. The range angle is readily calculated when the altitude and the path of the falling bomb are sufficiently known.

Ordinarily it is not feasible to determine all of the above factors in advance of bombing flight and it is difficult if not impossible to make the calculations accurately and quickly under usual bombing conditions especially when the attention is distracted by anti-aircraft fire.

The present invention has for an object to provide mechanism to facilitate the calculation of the variable factors which it is necessary to know to insure accurate fire.

Another object is to provide mechanical devices for assisting the pilot to direct the flight of an aircraft accurately above an observed target and to enable the bombardier to determine the exact moment for dropping the bomb in order that it may hit the target.

Other objects will be obvious or will appear from reading of this specification.

The invention makes provision for mechanically calculating and indicating the ground speed and range angle and for indicating the angle of depression of the line of sight.

The apparatus described herein for the purposes of illustrating the invention comprises mechanism which mechanically calculates and indicates the range angle and which is easily operated without requiring constant calculation on the part of the observer. It is so arranged that the several factors are immediately indicated on suitable dials.

The device also provides, in its preferred form, means for automatically releasing the bomb when the angle of depression of the observer's sight corresponds to the range angle.

The range angle is treated herein as a function of the ground speed, altitude, air speed, terminal velocity and angle of drift. The range angle is also treated as the angle whose tangent is the horizontal distance in the direction of the line of flight that the bomb will travel during its fall divided by the height of the craft above the target at the time the bomb is released. The horizontal distance travelled may be represented with sufficient accuracy by the formula $G(Tv+Lt) - (UoLt+La)$ in which G = the ground speed in feet per second,
Tv = the theoretical time of falling in vacuum, in seconds,
Lt = the time lag in seconds, i. e. the additional time of falling due to the resistance of the air,
Uo = the air speed in miles per hour,
La = the air lag in feet, a trail correction for resistance of the air to flight of the bomb. This correction may be best obtained from tables computed and compiled as the result of practical tests.

This formula is in part empirical but has been found to be sufficiently accurate for practical purposes, and the arrangement and design of the apparatus shown is based thereon. It will be understood, however, that another formula could be adopted or the same formula could be otherwise stated and the principles of the invention applied to develop a suitable calculating mechanism.

When the above formula is used as a basis, a curve representing the range angle at various altitudes for an aeroplane traveling at a predetermined speed plotted on cartesian coordinates, in which the ordinates represent the logarithms of the altitudes and the abscissae represent the logarithms of the range angles, is nearly a straight line.

Similar curves plotted for various ground speeds are in general nearly parallel. In order to provide a system which can be more conveniently used in a mechanical calculator, the reference scales can be modified to cause the curves when plotted thereon to become substantially straight lines in all cases, within predetermined limits as for example, between speed limits of 70 and 140 miles per hour and between altitudes of 2,000 and 20,000 feet. The resultant plot is substantially that shown in Figure 28 of the drawings. This figure is not drawn accurately to scale but is shown merely to indicate the method of development of the system and to illustrate certain principles of the invention. The plot forms the basis of the apparatus to be particularly described and illustrated in the accompanying drawings and is in effect mechanically reproduced therein.

The apparatus is so designed that when suitable dials are set to correspond to the various factors such as ground speed, air speed, altitude, terminal velocity and angle of drift, the range angle is automatically indicated by a suitable pointer on a graduated dial. Factors which under the conditions to be encountered are constant may be set by hand. Variable factors are preferably automatically set and maintained in proper setting by suitable devices designed for the purpose which in turn either are controlled by automatically operated mechanism or are controlled as by a sighting telescope or other device suitably trained by an observer.

Factors such as the air speed and altitude may be automatically set from controls sensitive to variations in air speed and altitude or they may be set by hand. The altitude may for example be automatically set from a range finder carried by the observer or incorporated in the sight.

The apparatus illustrated is designed for use under such conditions that the air speed and altitude may be treated as constants for a particular operation and these factors are therefore introduced into the apparatus by a hand setting.

The ground speed is automatically calculated by means controlled by the rate of angular movement of the telescope sight and modified by an element adjustable to correspond to the altitude.

The invention will be better understood from a description of a particular selective embodiment thereof. For the purposes of such description, reference should be had to the accompanying drawings forming a part hereof and wherein.

Figure 2:
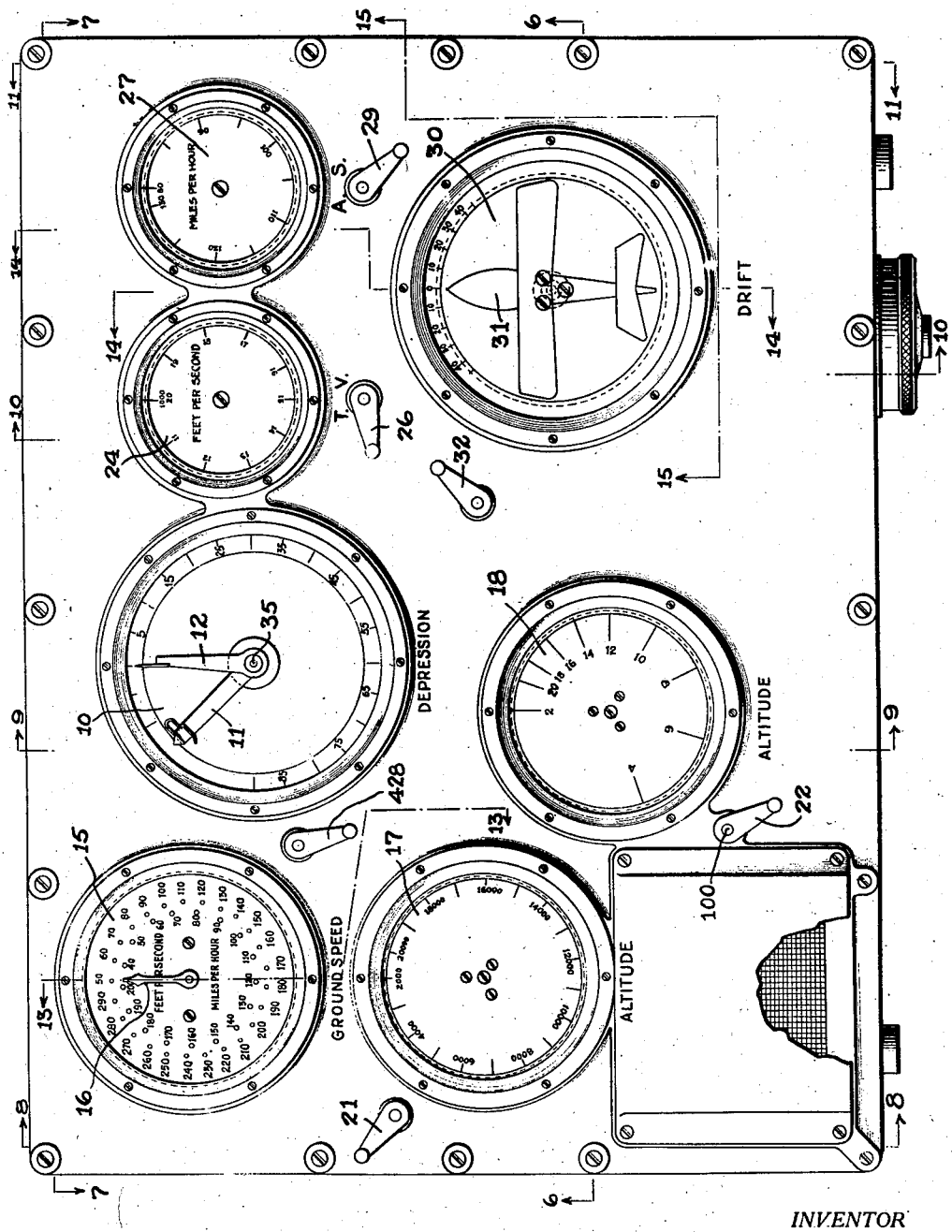
Figure 2 is a top plan view of the calculator mechanism showing the face plate thereof.
Figure 3:
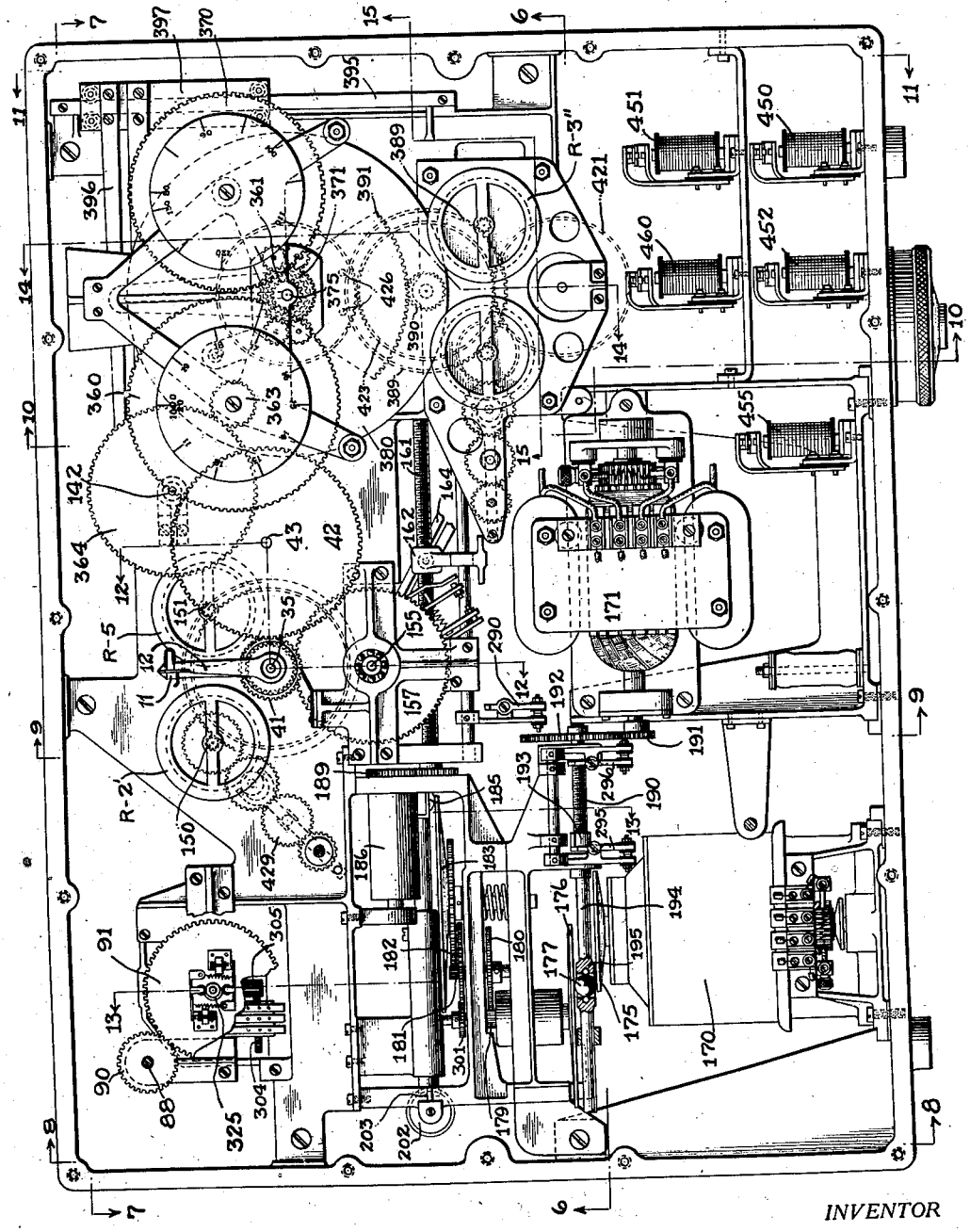
Figure 3 is a plan view of the calculator mechanism with the top face plate removed.
Figure 4:
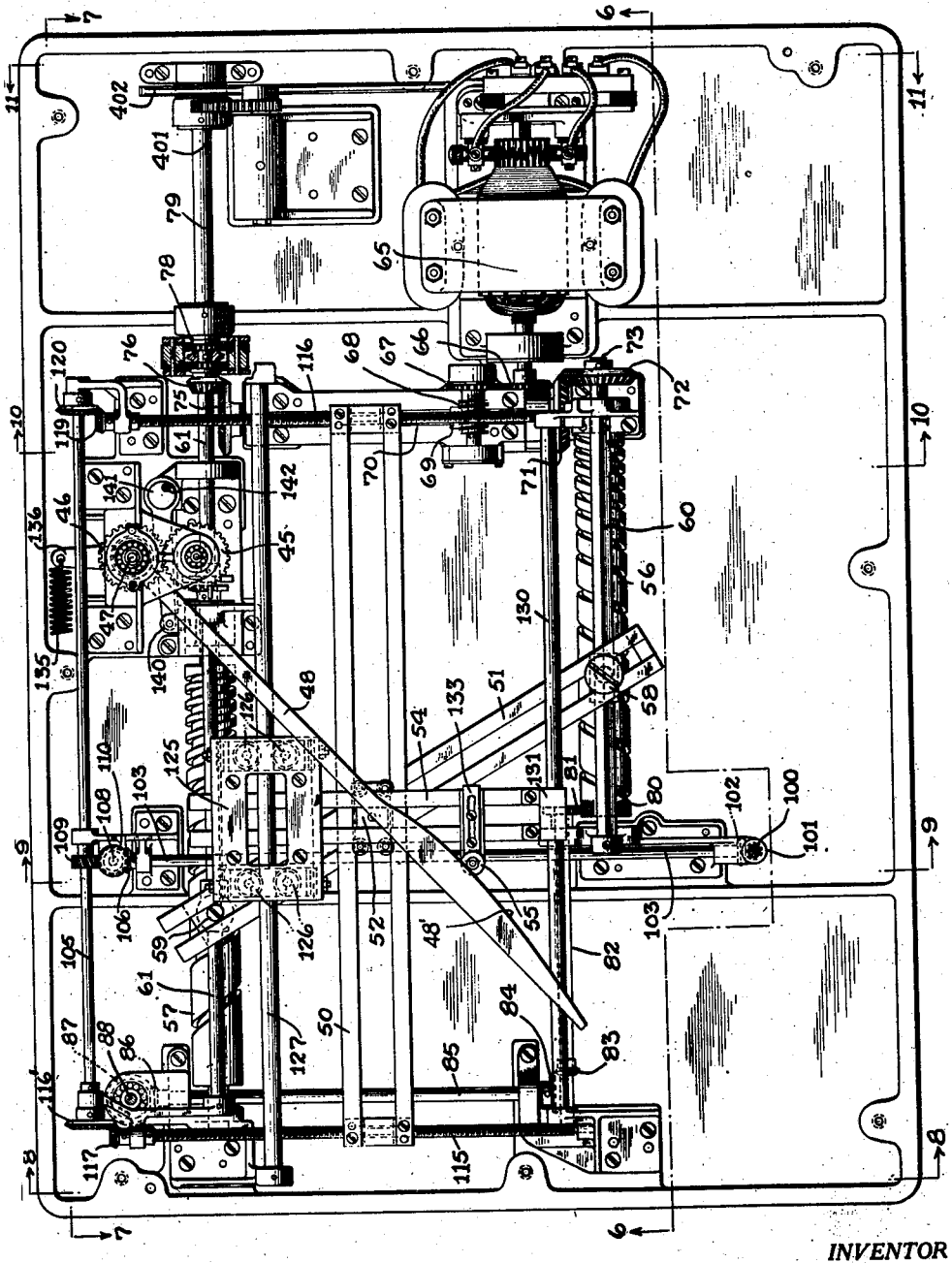
Figure 4 is a horizontal plan view of the lower portion of the calculator mechanism showing particularly the ground speed cams and associated calculating mechanism together with the follow-up motor for actuating the same. This view is taken substantially on the plane indicated by the line 4—4 Figure 6.
Figure 6:
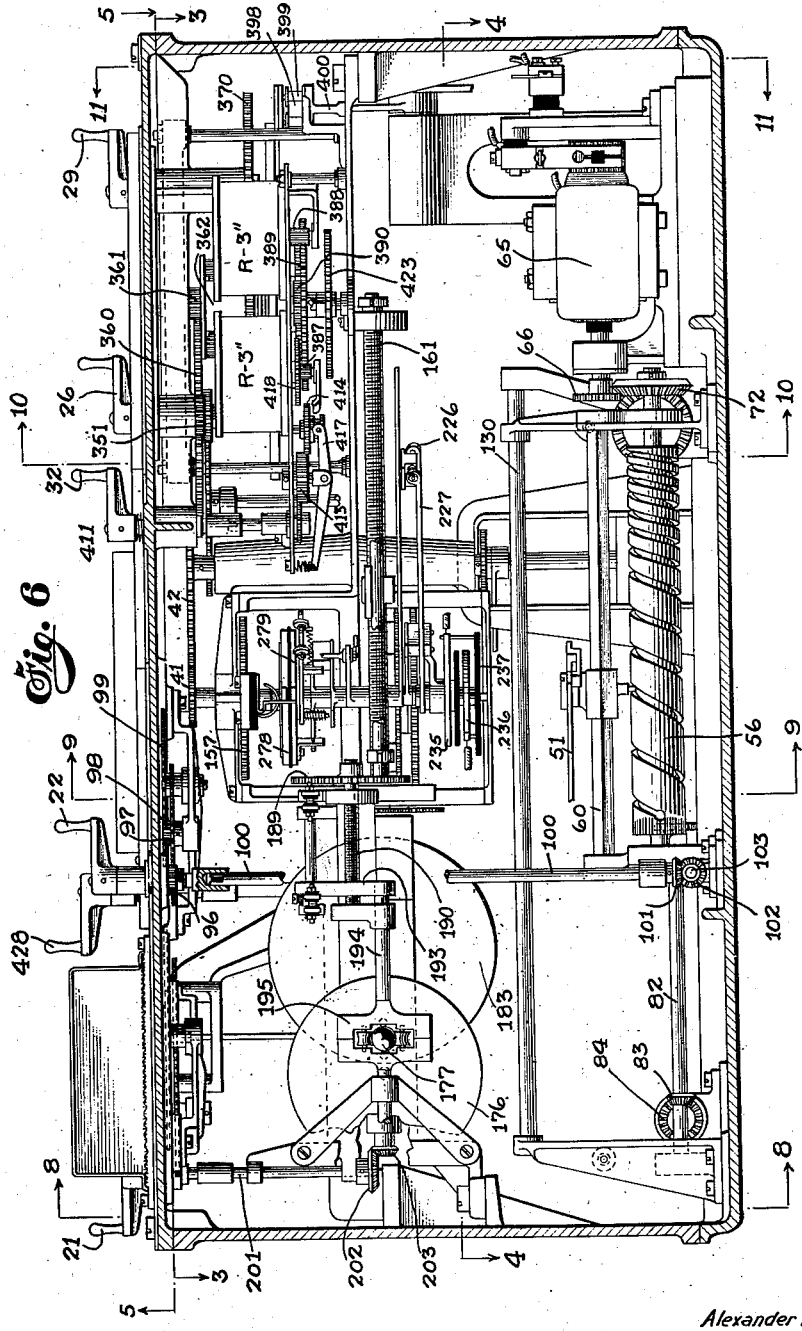

Figure 6 is a vertical sectional view, looking toward the rear, the upper portion of which is taken on the line 6—6 Figures 2 and 3 and the lower portion of which is taken on the line 6—6, Figure 4.

Figure 7:
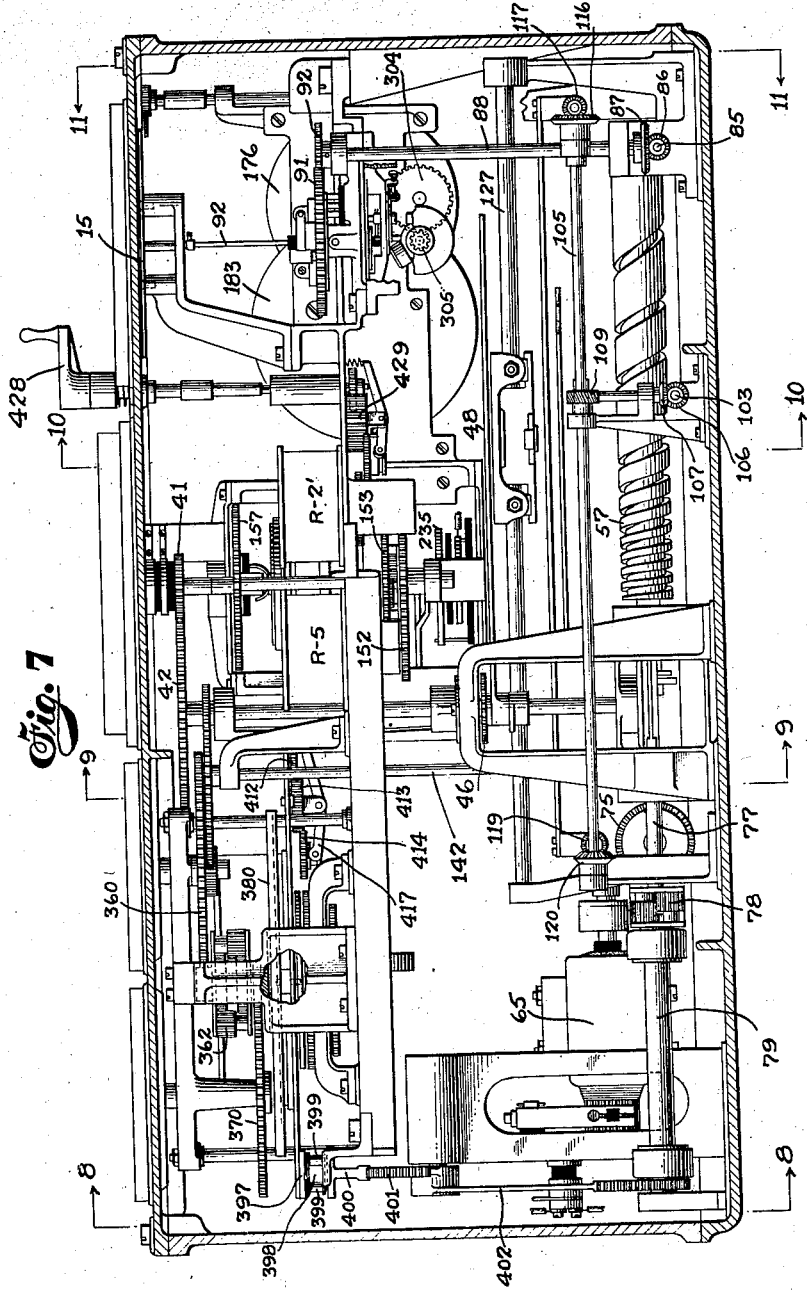

Figure 7 is a vertical sectional view looking from the rear and taken on the line 7—7 Figures 3 and 4.

Figure 8:
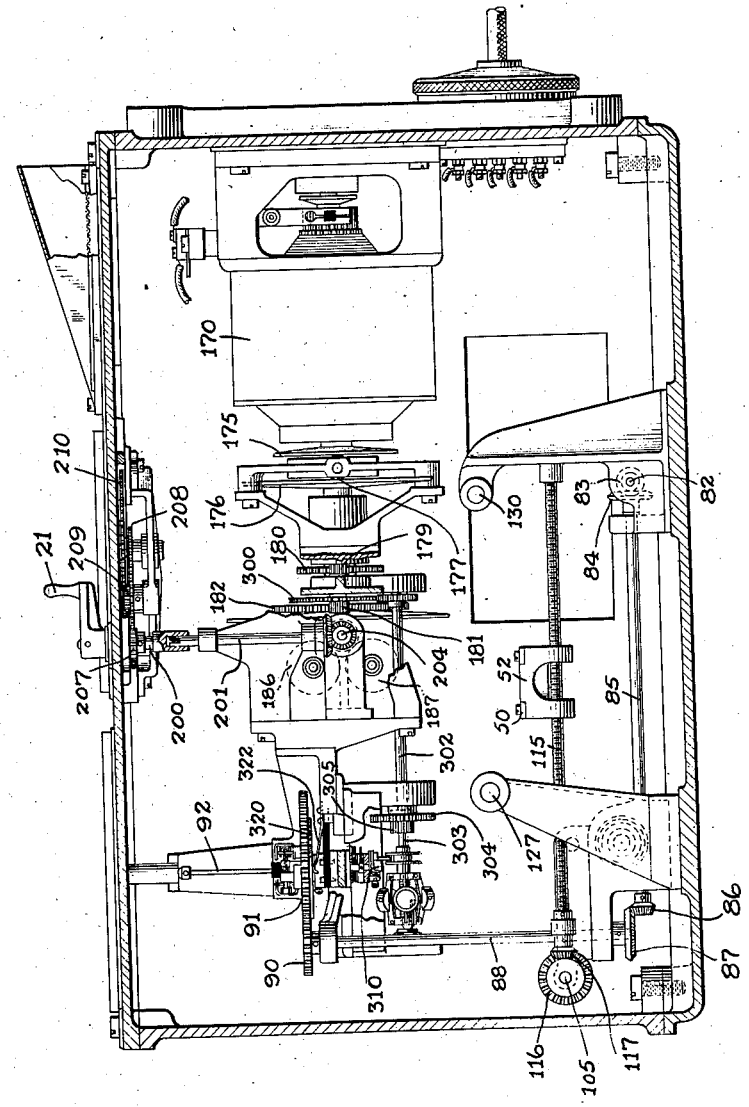
Figure 9:
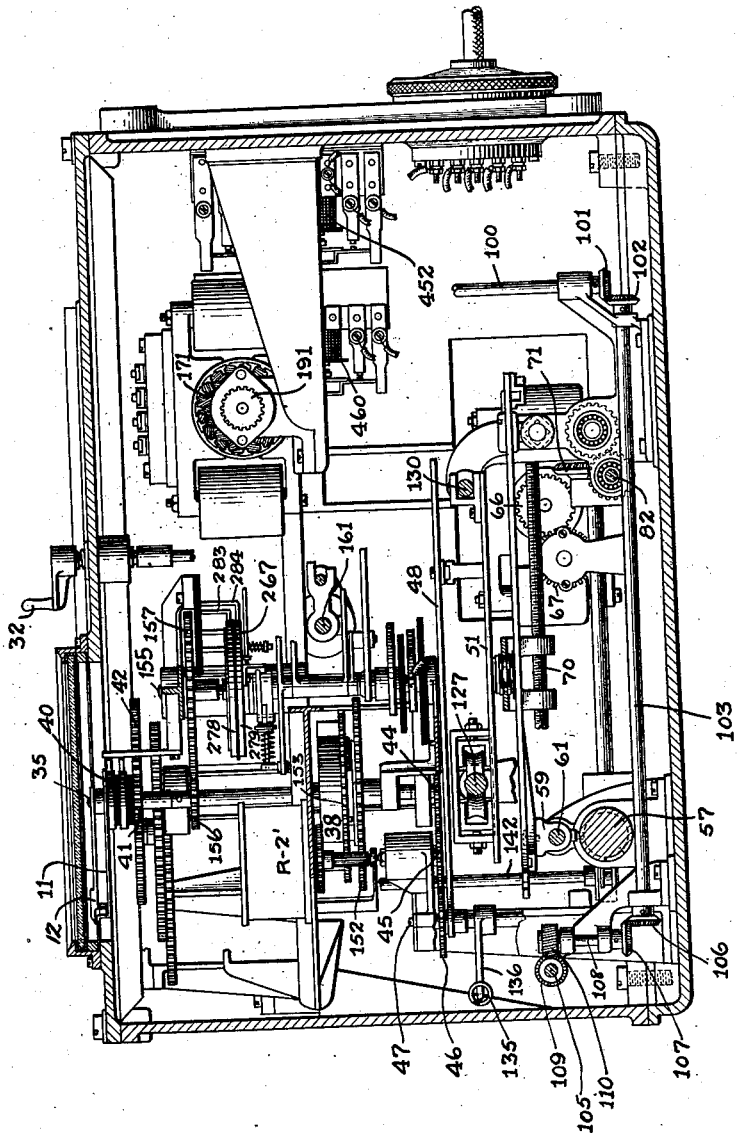
Figure 10:
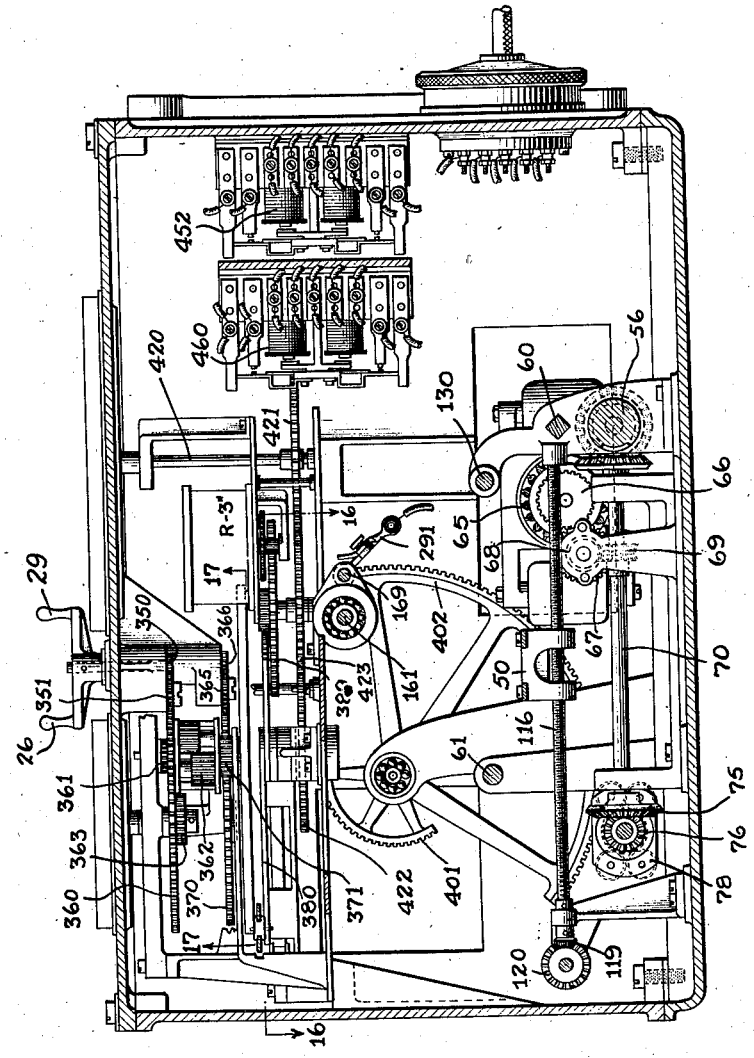

Figures 8, 9 and 10 are vertical sectional views, looking towards the right and taken on the lines 8—8, 9—9, and 10—10 respectively as shown on Figures 2, 3, 4, 6 and 7.

Figure 11:
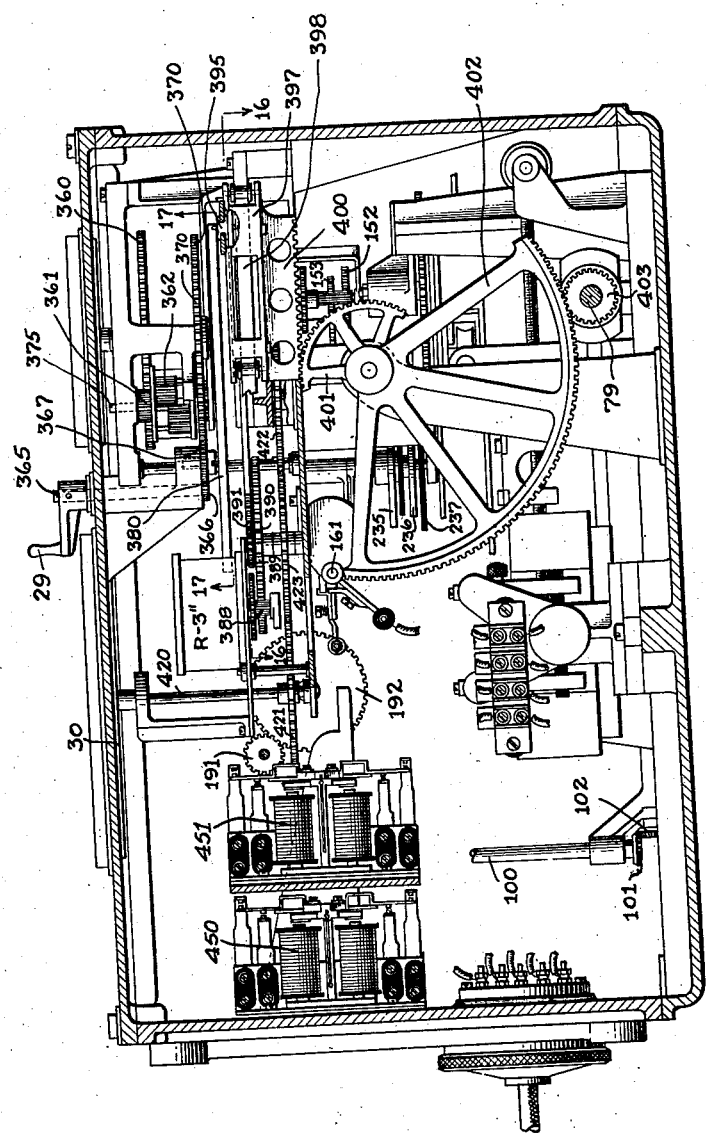

Figure 11 is a vertical sectional view taken on the line 11—11 Figures 2, 3 and 4 looking towards the left.

Figure 12:
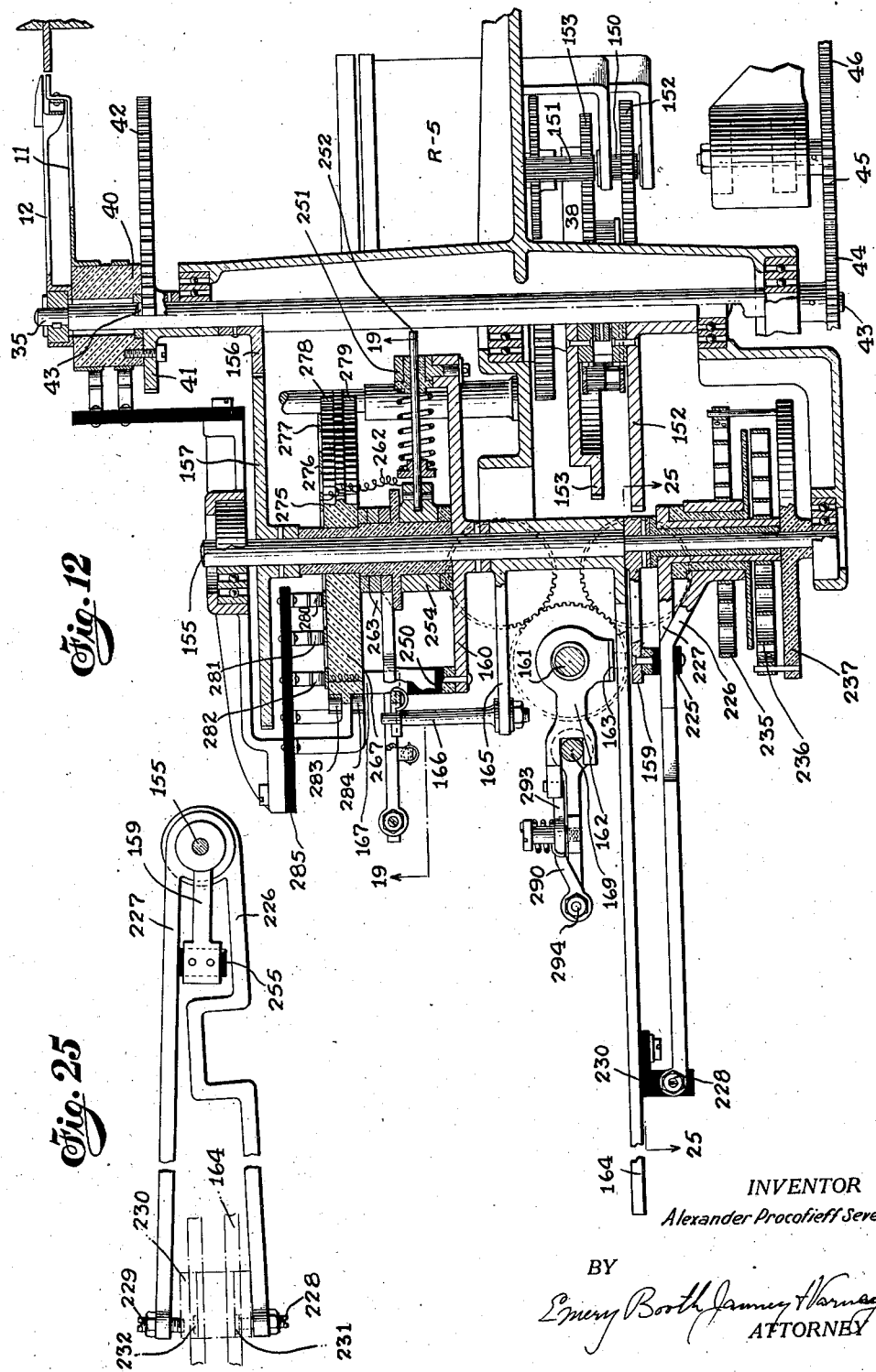

Figure 12 is an enlarged detail sectional view looking towards the left of the mechanism for controlling the electric circuits of the ground speed motor and control motor, taken on the line 12—12, Figure 3.

Figure 13:
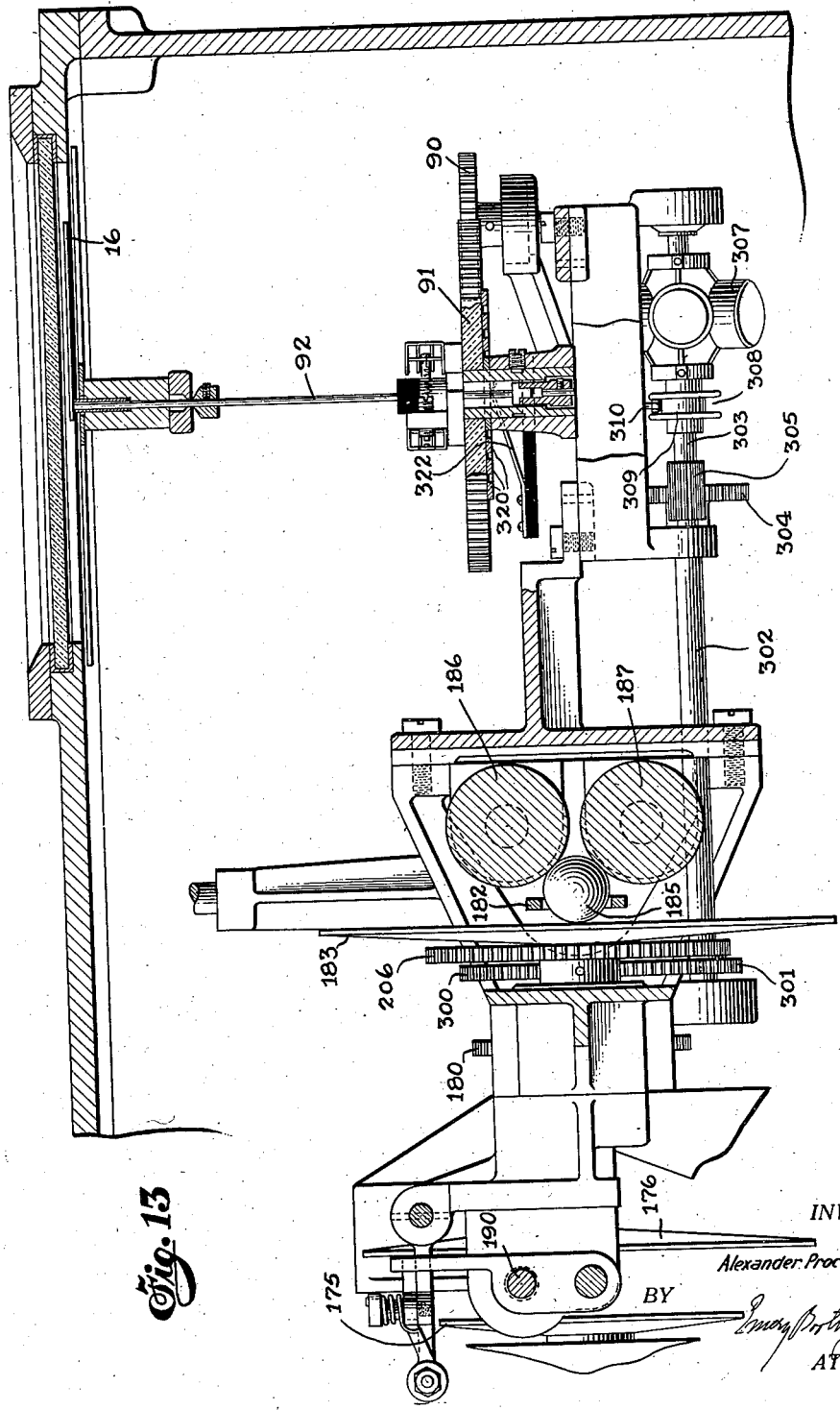

Figure 13 is an enlarged detail sectional view showing the mechanism for controlling the electric circuits of the follow-up motor taken on the line 13—13 Figures 2 and 3.

Figure 14:
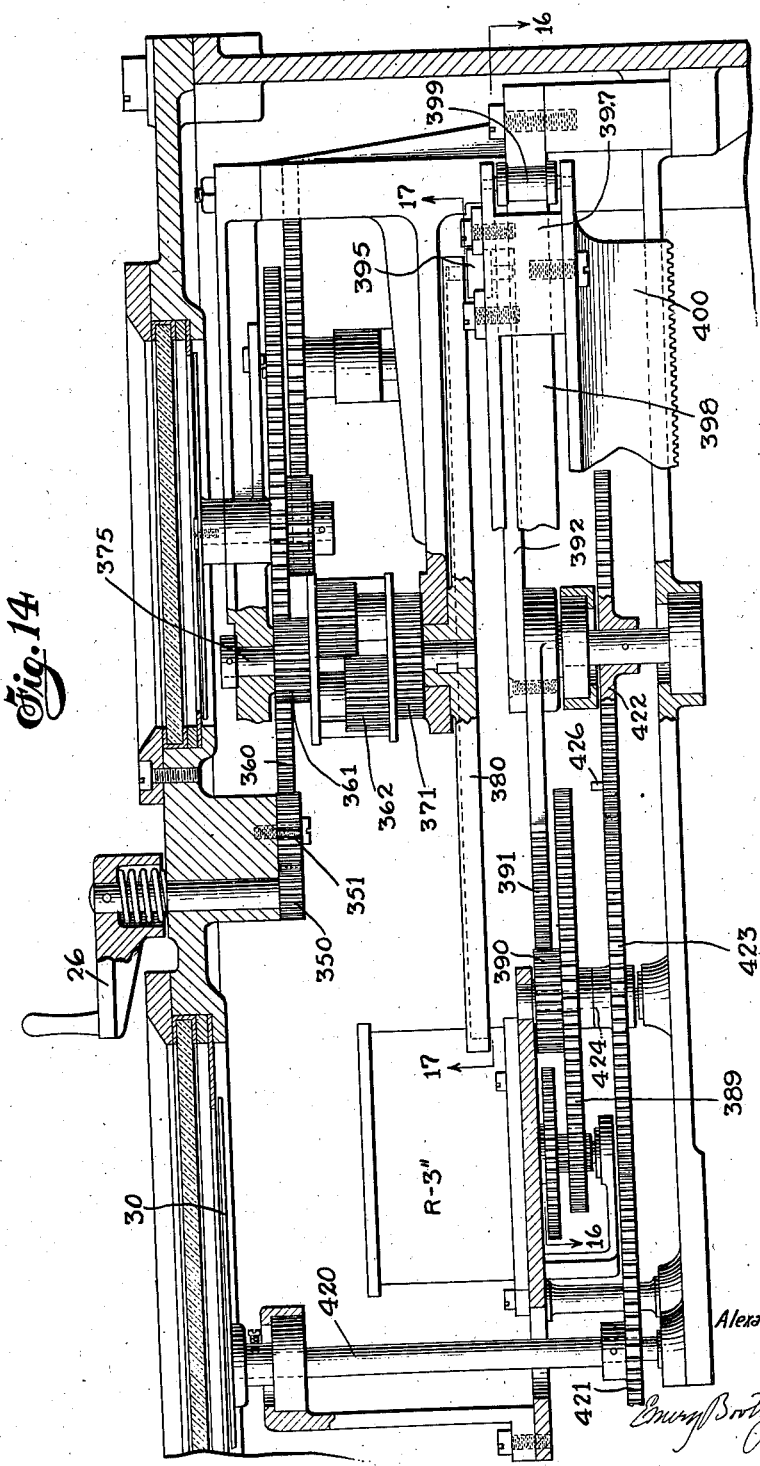

Figure 14 is an enlarged sectional view showing the mechanism for calculating the correction for terminal velocity, air speed and drift taken on the line 14—14 looking toward the left on Figures 2 and 3.

Figure 15:
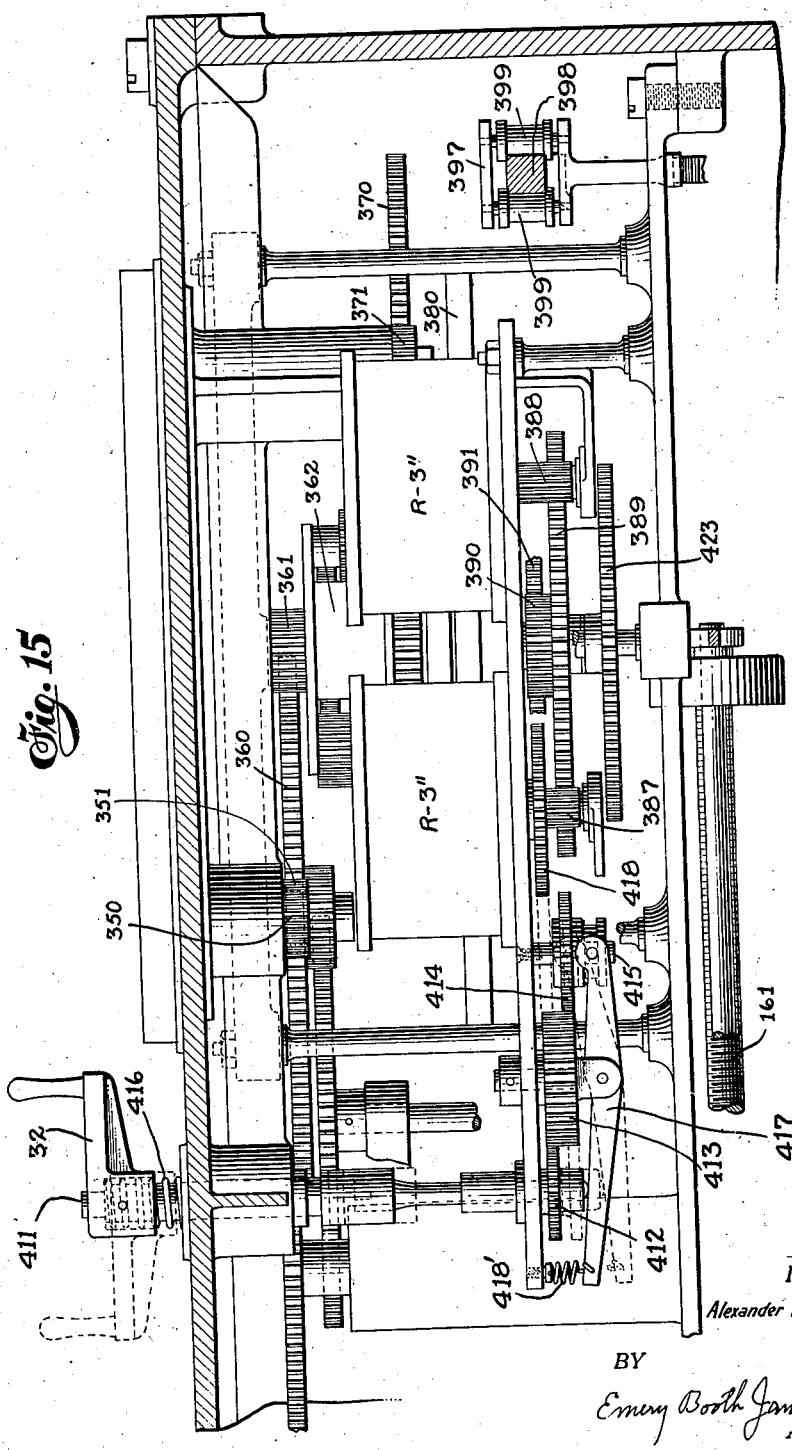

Figure 15 is an enlarged detail sectional view of the mechanism for calculating the correction for terminal velocity, air speed and drift taken on the line 15—15 looking toward the rear on Figures 2 and 3.

Figure 16:
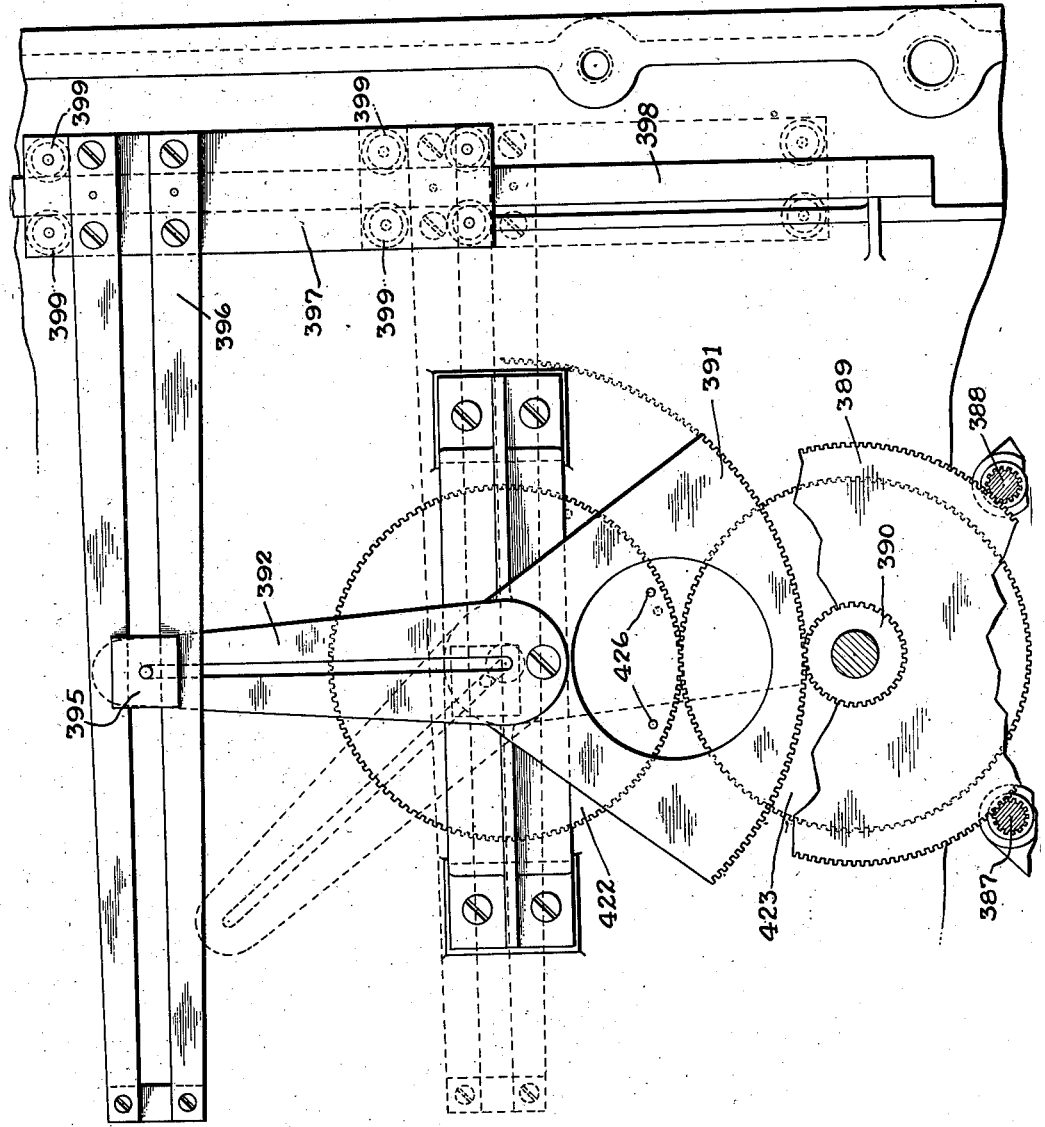

Figure 16 is a plan view of a portion of the same mechanism taken on the line 16—16 Figures 10, 11 and 14.

Figure 17:
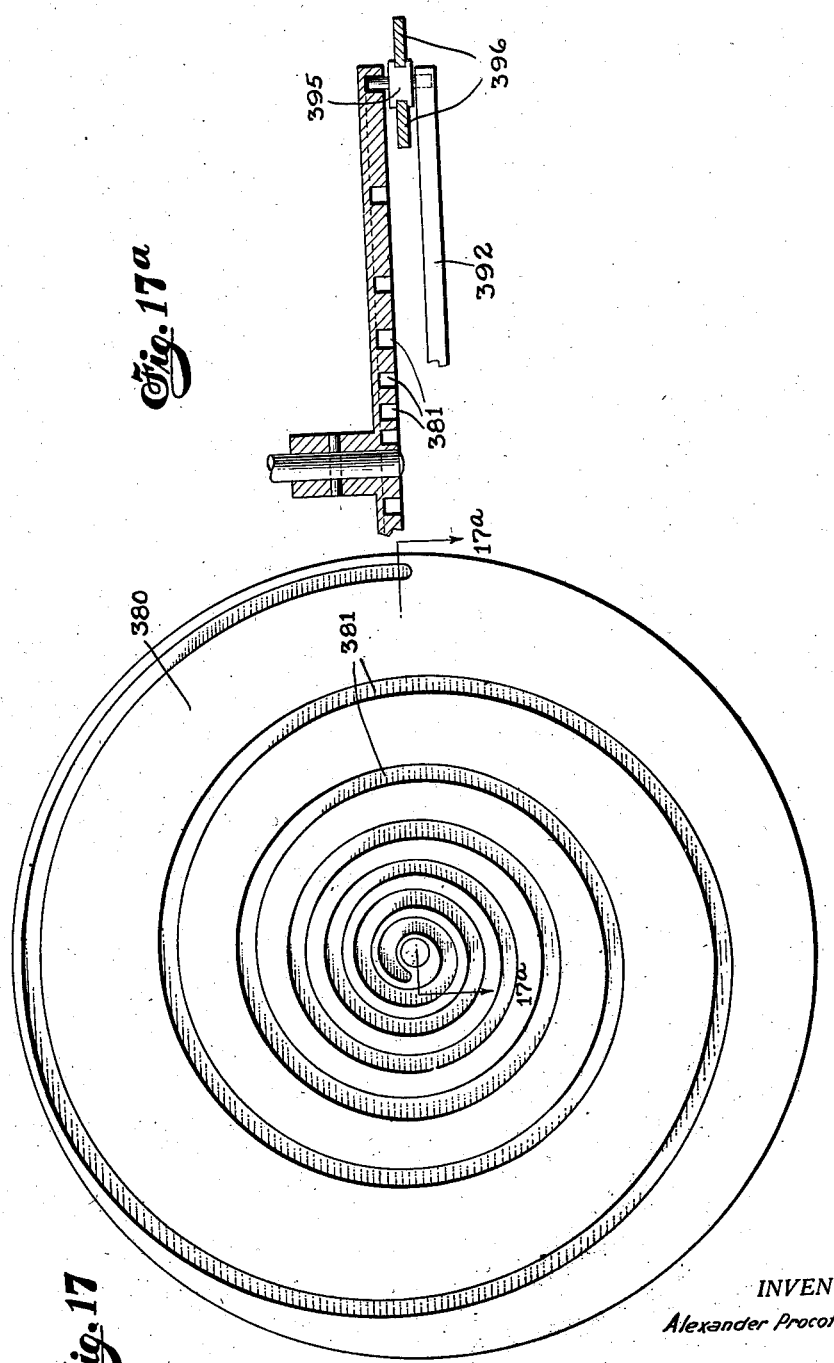

Figure 17 is an enlarged detail view of the face cam 380 taken on the line 17—17 Figures 10, 11 and 14 looking up.

Figure 17a is a sectional view of the face cam taken on the line 17a—17a of Figure 17.

Figure 18:
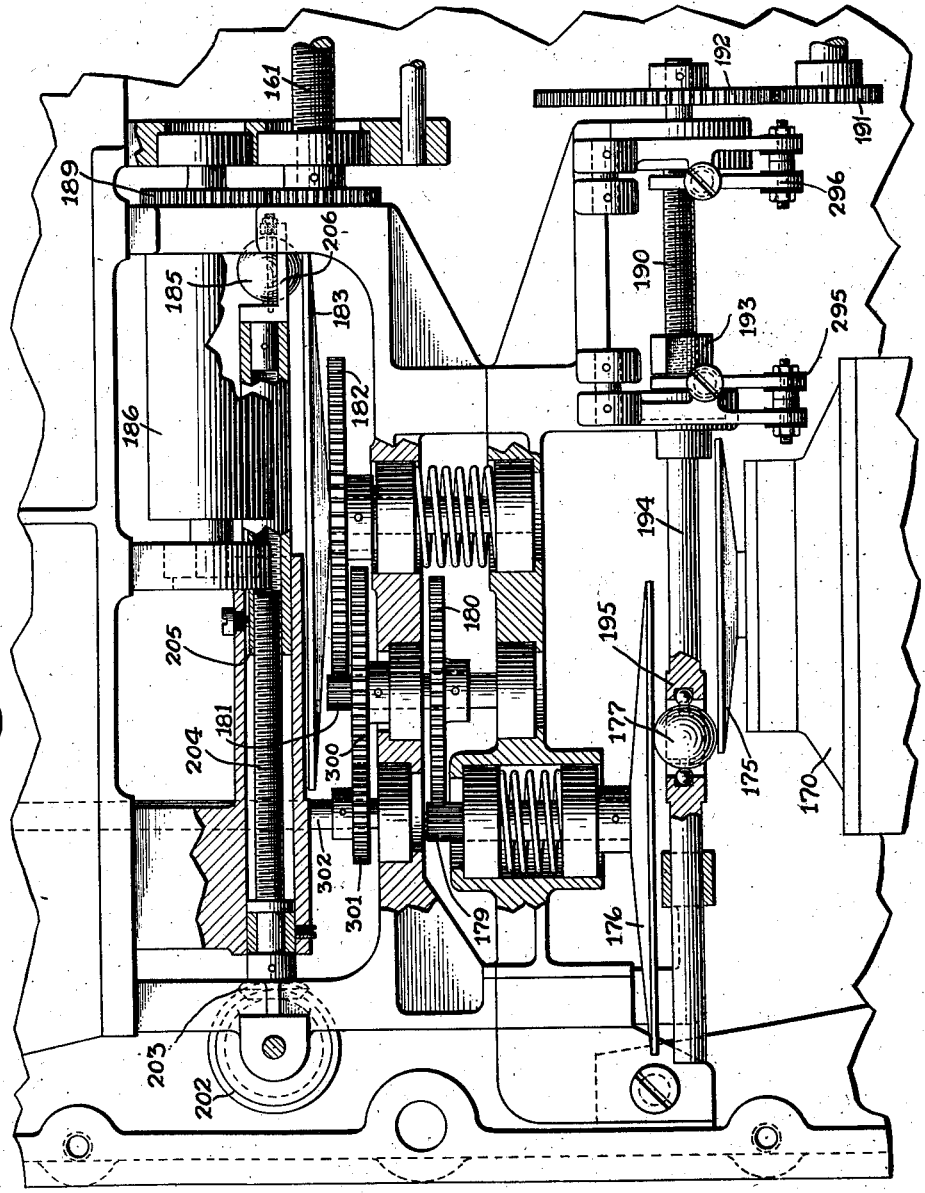

Figure 18 is an enlarged detail plan view partly in section showing the driving mechanism between the ground speed motor and the ground speed screw.

Figure 19 is a sectional view taken on the line 19—19 Figure 12 looking up.

Figure 20 is a similar view but showing the parts in another position.

Figure 21 is an enlarged detail view of a portion of the control for the control motor and ground speed motor.

Figure 22 is an enlarged detail view of the mechanism for moving one of the ground speed cams to compensate for terminal velocity.

Figure 23 is a side elevation partly in section of the same.

Figure 24 is a detail sectional view taken on the line 24—24 Figure 23.

Figure 25 is a detail view taken on the line 25—25 of Figure 12

Figure 26 is a diagrammatic view of the electrical connections.

Figure 27 is a detail view similar to Figure 12 showing additional mechanism including a target bearing indicating hand which is automatically actuated independently of the telescope.

Figure 28:
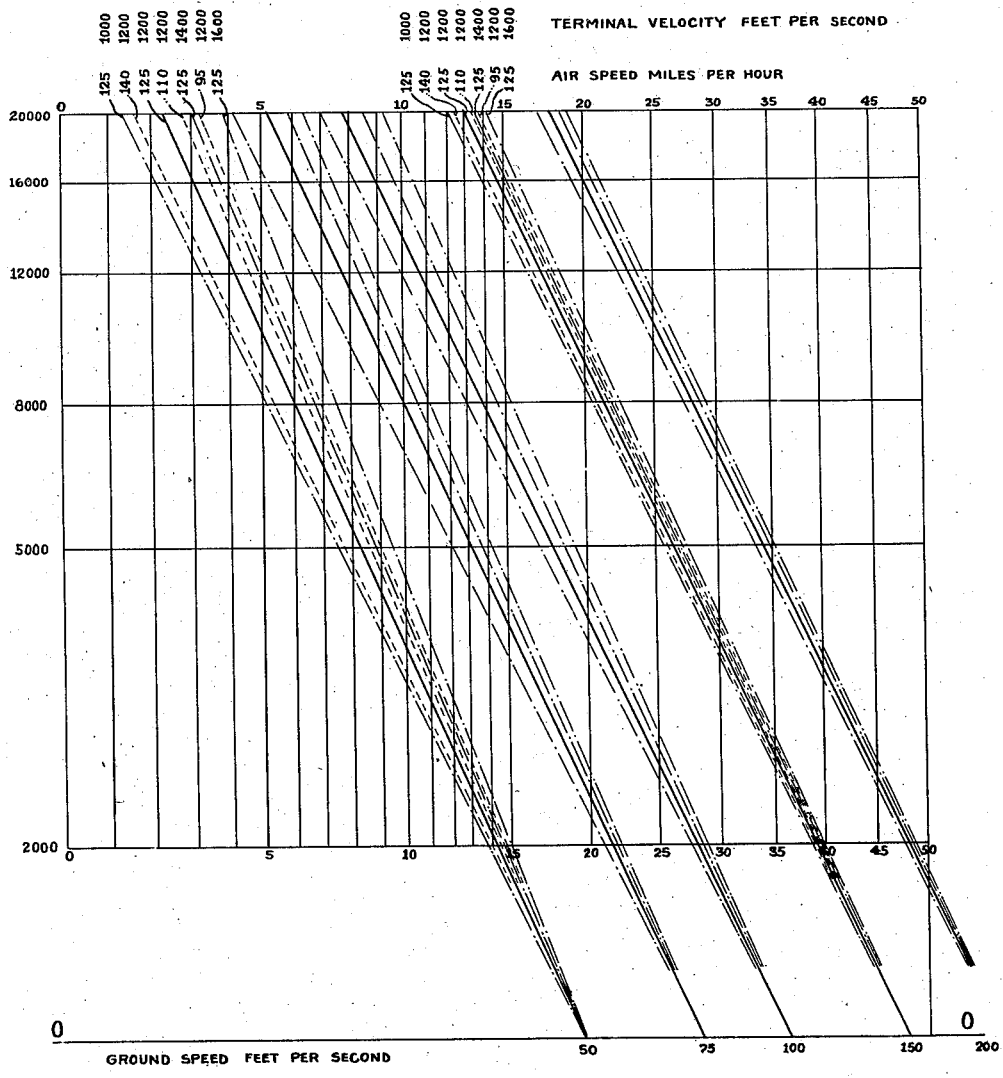

Figure 28 is a plot showing the relation of range angles for different conditions.

Figure 29:
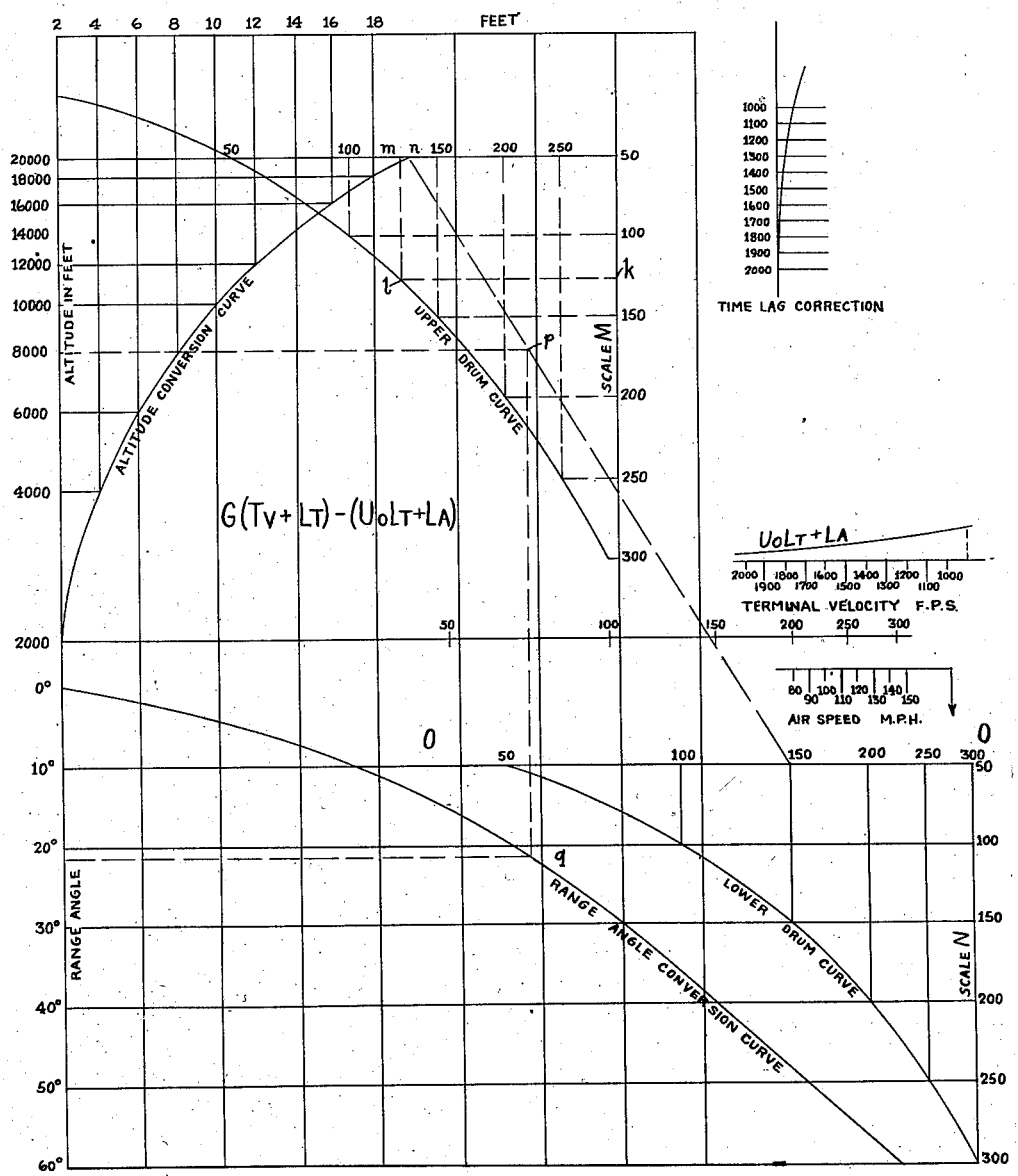

Figure 29 is a diagram showing the several curves and arrangement of plots on which the construction of the calculator mechanism is based.

The apparatus illustrated herein is designed primarily for use with aircraft manned by three persons including an observer who maintains the sighting telescope trained continuallly upon the target; a pilot whose duty it is to approach the target at the proper angle at a constant speed and in a horizontal plane; and a bombardier whose duty it is to attend to the dropping of bombs and to make observations of altitude, air speed, drift and the like and to set the corresponding elements of the apparatus accordingly.

The drift angle indicator may however be incorporated in the base of the sight cradle and the whole apparatus operated by an observer and a pilot if desired.

The apparatus to be herein more particularly described is designed to make the desired calculations of ground speed, range, angle and angle of depression and to indicate the same on suitable dials thus relieving the bombardier from the necessity of making mathematical calculations or using tables for this purpose. It is an improvement upon that shown in my co-pending application for a patent for "Sighting control for aircraft" Serial Number 551,191, filed April 10, 1922, and is in part the same as the apparatus shown therein. Reference should be made to said application for more complete description of such operations of the apparatus as are not herein explained in detail.

Figure 1:
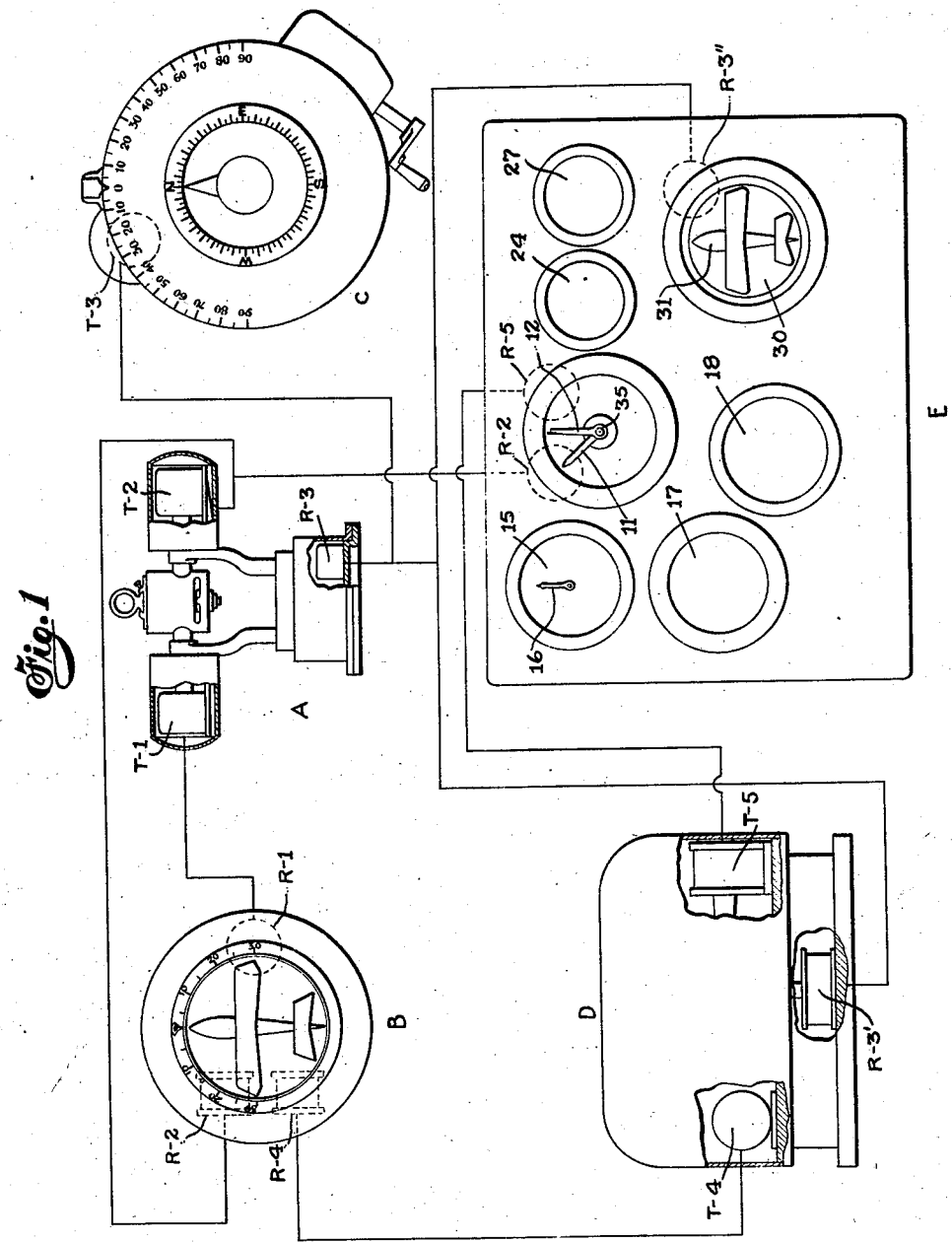
Figure 1 is a diagrammatic assembly view of illustrative sighting and calculating apparatus constructed in accordance with and embodying the principles of the invention.

Referring to the drawings and especially to Figure 1 in which is indicated diagrammatically the relative arrangement of the several parts of the apparatus, a sight cradle A has a universally pivoted sighting telescope arranged to be continuously trained on the target by the observer. A pilot's flight director B is provided for the use of the pilot to indicate the course to be followed. A drift indicator C is arranged to be set as nearly as possible to the angle of drift by the bombardier. A stable base D, comprising a suitably operated gyroscope, pendulum or other suitable device, affords means whereby correction can be made for the pitching and rolling of the aircraft in calculating the angle of depression and the other factors and in maintaining the direction of flight. The calculator itself with which this invention is more particularly concerned is indicated at E.

The lines connecting the various instruments show the manner in which they interact and it will be understood that such interaction may be brought about by mechanical, electrical or other means. I have illustrated electrical transmission of action and have indicated the originating device for an electric impulse in each case as T and the receiving and repeating device in each case as R. I shall allude to the former herein as the "transmitter" and to the latter as the "repeater". Transmitter and repeaters of this nature are well known and no further description thereof will be given. The observer as above indicated, maintains the telescope which is universally pivoted, trained continuously on the target and since the base of the sight cradle is fastened rigidly to the body of the aircraft, the line of sight will be continuously changing its relation to the longitudinal and vertical axes of the craft. Lateral movement of the line of sight will occur whenever the craft deviates from its true course whether such deviation be accidental or to correct drift. Lateral movement of the line of sight and of the telescope relative to the fixed base of the sight cradle will also be caused by rolling of the craft or by movement of the target. The angle of depression or its complement, the angle made by the line of sight with the vertical, will change as the craft approaches toward or recedes from the target and will be the sum of the angle of the line of sight relative to the craft and the angle of the craft relative to a horizontal plane. The changes introduced by rolling are very small and can be neglected, so far as the calculation of the range angle and angle of depression are concerned. However, my system takes them into account and compensates for them in the control of the pilot's director.

From the above it will be apparent that as the craft moves in its course, deviation of the line of sight relative to the craft both laterally and in the vertical plane are continually taking place under the influence of several factors.

Referring to Figure 1 all movements of the line of sight laterally made by the observer in keeping his telescope trained on the target will actuate transmitter T—1 and all movements at right angles thereto will actuate transmitter T—2. Transmitter T—1 is connected to repeater R—1 in the pilot's director B and this repeater R—1 acts directly upon the pilot's director mechanism. Transmitter T—2 is connected to a repeater R—2 also acting directly upon the pilot's director mechanism, and to a second repeater R—2' acting upon the depression angle indicator in the calculator and indicator mechanism E. Allowance is made for drift by manual adjustment of the drift indicator C to steady zero reading with the magnetic needle. Transmitter T—3 on the drift indicator controls repeater R—3 on the sight cradle A and turns the cradle to allow for the drift. It is necessary also to aline the longitudinal axis of the stable base D with the true course toward the target since all vertical angles are to be measured in a vertical plane of which the course is the horizontal projection or trace. This is accomplished by a repeater R—3'.

The stable base D corrects for errors due to rolling through transmitter T—4 and repeater R—4 at the pilot's director B and for errors due to changing elevation or pitching through transmitter T—5 connected to repeater R—5 at the depression angle indicator of the calculator E.

It is now evident that all observations and corrections are integrated to the three repeaters at the pilot's director B and their final integration at that point furnishes true indication for the pointer or needle. This mechanism is more particularly described in my co-pending application to which reference was above made.

*General plan of calculator mechanism*

The calculating mechanism with which this invention is more particularly concerned is mounted in a suitable casing which for convenience will be described as horizontally positioned with suitable indicating dials and controlling cranks arranged upon the top thereof, but it will be understood that, as a matter of fact, it is immaterial whether it is positioned horizontally, vertically or otherwise.

Figure 2 is a plan view of the top or face plate. The range angle and the angle of depression are indicated upon a graduated dial 10. The hand 11 controlled by the calculating mechanism of the apparatus indicates the range angle. A hand 12, actuated by repeaters or motors under control of the sight and stable base or other suitable devices outside of the calculator indicates the angle of depression upon the same dial 10.

The ground speed of the craft is indicated upon a dial 15 by a hand 16 controlled by the calculator mechanism. The altitude is indicated by suitable graduated rotatable dials 17 and 18 which are set by hand by means of the cranks 21, 22 to correspond to the altitude of the craft. The terminal velocity is indicated by a suitably graduated rotatable dial 24 which is set by means of a hand crank 26. The air speed is indicated by a suitably graduated rotatable dial 27 set by means of a hand crank 29. The drift is indicated by a rotatable dial 30 having marked thereon a suitable pointer 31, which is automatically controlled by a repeater or motor R—3'' (Figure 3) to indicate the angle of drift of the craft. When necessary this dial can be set by means of a hand crank 32.

The range angle indicating hand 11 is controlled by a series of cams and the like each controlled by one or more of the elements set to correspond to the factors which modify the range angle and which cams are constructed and arranged to reproduce in the indicating hand control mechanism effects corresponding to the factors represented. The movable parts of the mechanism are in large measure actuated by motors controlled by suitable relays to make possible the use of sensitive control devices.

*Depression angle indicator*

In order to know the position of the craft relative to the target an arrangement is provided for observing and registering on a suitable dial the angle of depression of the sight when trained upon the target, that is to say, the angle between the horizontal and the line of sight from the aircraft to the target. In the apparatus shown the telescope which constitutes a sight, moves as a whole and the observer must move somewhat to follow the sight but obviously by the use of a revolving mirror, prism or the like the telescope may be held stationary and another sight element may be arranged to move to follow the target. In the apparatus shown the dial is graduated for convenience to indicate the complement of the angle of depression.

*Range angle calculating mechanism*

The depression angle pointer 12 is fast to the shaft 35, Figures 3, 9, 12, which shaft is driven by the telescope controlled repeater R—2' and the stable base controlled repeater R—5, Figures 3 and 7 through the differential mechanism 38 mounted on shaft 35, Figures 9 and 12. The range angle pointer 11 is carried on a hub 40, Figure 12, loosely mounted on the shaft 35 and driven from the calculator mechanism shown in Figure 4 by means of gearing comprising the pinion 41 fast to the range angle pointer hub 40, gear 42 meshing therewith, and carried on shaft 43, Figures 3 and 12, gear 44 on the lower end of shaft 43, idler pinion 45 shown in Figures 4, 9 and 12 and driving pinion 46 secured to shaft 47, Figures 4 and 9, which shaft 47 carries a cam arm 48 as best shown in Figure 4. The cam arm 48 is rotated about its axis to positions bearing a certain relation to the range angle, by the calculator mechanism to be described.

The calculator mechanism comprises, in general, an altitude bridge or guide 50 adapted to be set to correspond to the altitude or height of the craft above the target, and a ground speed bridge or guide 51 adapted to be set automatically to correspond to the ground speed. For high altitudes the altitude bridge is set in a position towards the top in Figure 4 and for low altitudes it is set in a position towards the bottom in said figure. For low ground speeds the ground speed bridge 51 is set in position towards the left in Figure 4 and for high ground speeds, towards the right.

A follower 52 is controlled by these two bridges and in turn controls the position of a follower bridge 54 which carries a roller 55 engaging and actuating the cam arm 48. The arm 48 actuates the range angle indicator 11 above mentioned.

The ground speed bridge is shown in Figure 4 as moved laterally by means of two cams 56 and 57 which engage slides 58 and 59, respectively carried on rods 60 and 61 supporting the bridge. These cams are rotated by a "follow-up" motor 65 through suitable gearing. As shown, a gear 66 on the motor shaft engages a gear 67 on a short parallel shaft, which latter shaft also carries a worm 68 meshing with a worm wheel 69 carried on a transverse shaft 70 beneath and parallel to the screw shaft 116. The shaft 70 through bevel gears 71, 72 drives the shaft 73 on which the cam 56 is rigidly mounted. The shaft 70 at its opposite end carries a bevel gear 75 meshing with a bevel pinion 76 connected to drive the shaft 77 (Fig. 7) on which the cam 57 is mounted through a differential gearing 78. The shaft 77 is also driven through this same differential gearing 78 by means of a shaft 79 which is rotated to and maintained in a position to make correction for the drift, air speed and terminal velocity. The shaft 79 rotates through a relatively small arc to make suitable corrections in the final result due to the above mentioned factors.

In order to prevent binding when the cam 57 is rotated alone, the ground speed bridge 51 is mounted to permit relative sliding movement between itself and one of the slides upon which it is carried. In the particular structure indicated, it is pivotally secured to the slide 58 but slidably connected to the slide 59.

The cam 56 is formed on its left end with a gear 80 which meshes with a pinion 81 on a shaft 82, and this shaft through bevel pinions 83 and 84 drives a shaft 85. Shaft 85 in turn, through the bevel gears 86, 87, Figure 8, drives a vertical shaft 88 having at its upper end a pinion 90 meshing with a gear 91 loosely rotatable on the spindle 92, Figures 8 and 13. Spindle 92 carries the ground speed indicating pointer 16, Figure 2. The follow-up motor is controlled to actuate the ground speed cams, and also to actuate the driving connections to gear 91 to maintain said gear 91 in predetermined relation to the ground speed indicator spindle 92, by means of an electrical follow-up mechanism shown in Figure 13 and hereinafter to be described. The follow-up motor 65, Figure 4, is caused to operate to always maintain the gear 91 in predetermined relation to the ground speed indicating pointer 16 and its spindle or shaft 92. By this mechanism the angular position of the cams 56 and 57 and therefore of the ground speed bridge 51 always corresponds to the ground speed as indicated by the ground speed pointer 16.

Figure 5:
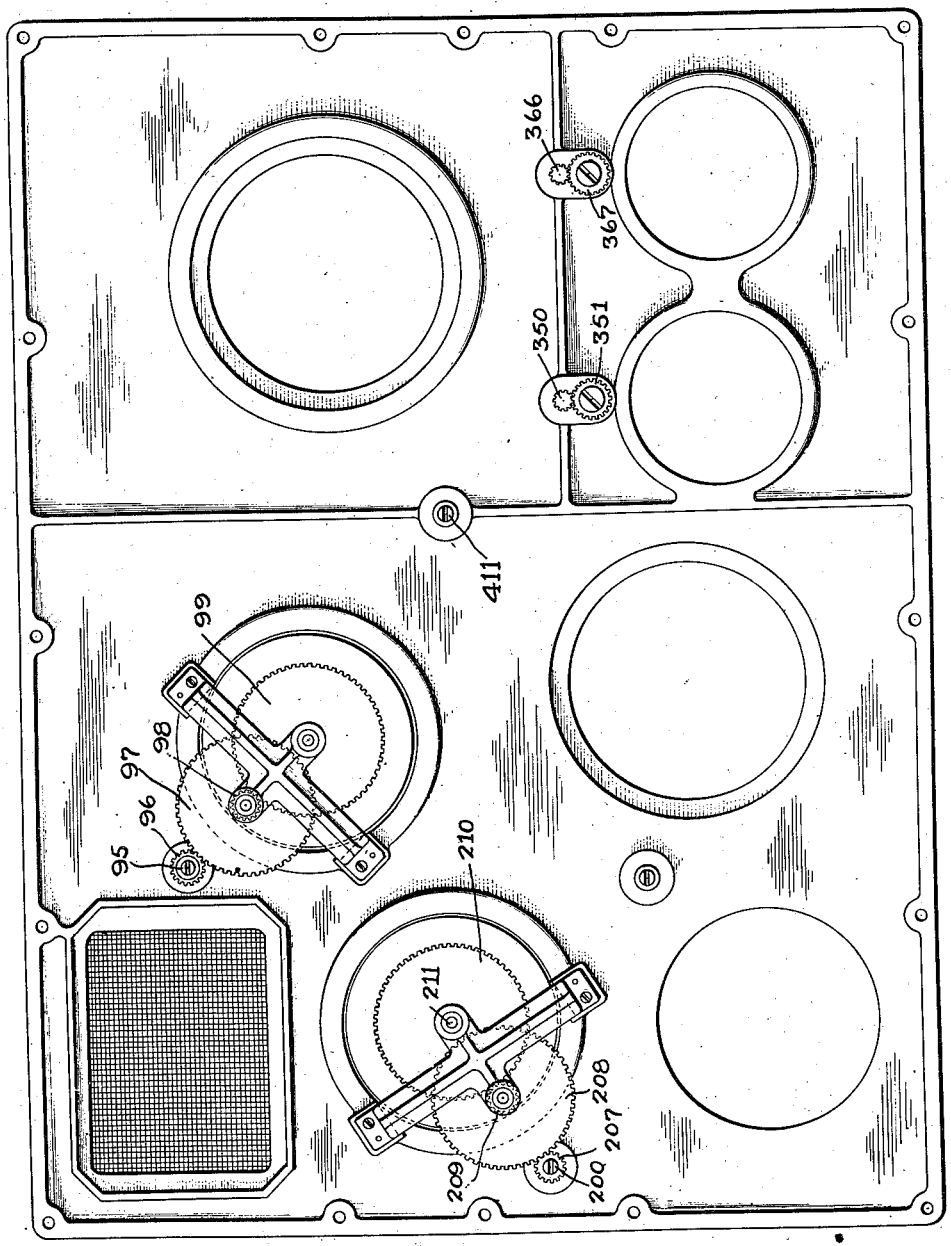
Figure 5 is a bottom plan view of the inside of the cover plate of the calculator taken substantially on line 5—5 of Fig. 6.

The altitude bridge 50 is set manually in the apparatus illustrated to correspond to the altitude of the aircraft or its height above the target if the target is at an elevation. As shown, the altitude hand crank 22 is secured to a short shaft 95 carrying a pinion 96 just beneath the top plate of the casing. As best shown in Figures 5 and 6 the dial carrying shaft is driven from pinion 96 by means of gears 97, 98 and 99. The short shaft 95 is operatively connected to a vertical shaft 100 through which the altitude bridge is adjusted. In order that the cover plate may be easily removed and replaced the proximate ends of the two shafts are so formed to be operatively connected by a direct thrust. The other similar connections between shafts carried in the cover plate and other shafts alined therewith are made in the same manner and such connections need not be again described. Shaft 100 through bevel gears 101, 102, Figures 4, 6 and 9, drives horizontal shaft 103 and this shaft in turn is geared to drive horizontal shaft 105 through bevel gears 106, 107, vertical shaft 108 and spiral gears 109 and 110. The two screws 115 and 116 carrying the altitude bridge 50 are synchronously driven from the shaft 105 through bevel gears 116', 117 and bevel gears 119, 120 respectively.

The sliding follower bridge 54 is connected to a suitable carriage 125 so designed as to avoid any difficulty due to cramping or binding on its ways. This carriage is provided with four rollers 126 engaging a supporting rod 127 on which it slides. The other end of the bridge 54 is connected to a second guide rod 130 by means of a bracket 131 freely engaging the same. The roller 55 is carried in a bracket 133 adjustably secured to the bridge 54. The cam arm 48 presents a cam surface engaging the roller 55 which cam surface is so calculated as to cause substantial accuracy in the angular movement of the arm under the control of the roller 55. A spring 135 engaging arm 136 rigidly connected to cam arm 48 yieldably holds said cam arm 48 in engagement with the roller 55.

The contour of the cam can for example be developed by setting the several parts of the apparatus in a number of positions corresponding to selected conditions, also setting the arm 48 in the angular position so that the range angle pointer 11 will indicate the true range angles independently determined mathematically or otherwise for the respective sets of conditions and then drawing the cam to approximate as nearly as possible desired results.

The cams 56 and 57 are designed to give accurate results when used for bombs falling at terminal velocities of between 1,000 and 2,000 feet per second and for air speeds of between 80 and 140 miles per hour. These cams are designed primarily to give the correct range angle for a bomb falling in air under normal conditions at a terminal velocity of 2,000 feet per second, and under such conditions that there is no movement of the bomb horizontally relative to the air, as for example when the bomb is dropped from a balloon traveling with the wind. In actual practice, however, it is desirable to make corrections for other influencing factors, as for example for a lesser terminal velocity of the bomb, for drift, etc. The correction for the terminal velocity is made by moving the cam 57 an amount which will depend upon the terminal velocity of the particular bomb to be dropped. This is accomplished by a mechanism part of which is shown generally in Figure 4 and in detail in Figures 22, 23, 24. A slide 140 is connected to an eccentric 141 on the vertical shaft 142 by a link 143. The shaft 142 is actuated by the hand crank 26, Figures 2 and 6, through suitable connecting gears 350, 351, 360, 363 and 364, Figures 3, 5 and 10. Said hand crank 26 being connected also to actuate one member of a differential mechanism later to be described. The gearing and the eccentric advantageously may be so designed and proportioned that the maximum effective rotation of the eccentric is about 45°, the operative position being so selected as to give a reasonably correct movement, as for example from the position shown in full lines in Figure 22 to the position shown in dotted lines in said figure.

In order to permit the longitudinal movement of the slide 140 and the cam 57 without disturbing the driving connections a sliding connection 145 is made between the cam shaft and the shaft 77, as shown in detail in Figures 22 and 23.

Ground speed

The ground speed, as a factor in determining the range angle, is derived as a function of the altitude and the rate of change of the angle of depression. The mechanism for computing the ground speed and for indicating its effect upon the range angle is shown in Figures 3, 6, 7, 9 and more particularly in detail in Figures 12, 13, 18 and 21. As above explained, shaft 35 carrying the depression angle pointer 12 is controlled by the telescope controlled repeater R—2' and the stable base controlled repeater R—5.

The repeater R—2' is controlled from the telescope or other observing sight to take a position corresponding to the angular position of the telescope relative to the aircraft and the repeater R—5 is controlled to take a position corresponding to the angular position of the aircraft relative to the horizon. The depression angle pointer as controlled by these two repeaters gives always the true angle of depression, or the complement of the angle of depression if the dial is so graduated as in the apparatus shown. These repeaters carry small pinions 150 and 151, Figures 3 and 12, which drive respectively gears 152 and 153 of the differential mechanism 38 and through this differential mechanism have equal effect in driving the shaft 35.

Provision is made for mechanically calculating the ground speed of the aircraft from the altitude of the craft and the rate of change of the cotangent of the angle of depression as factors (i. e. the tangent of the complemental angle). A considerable portion of the mechanism for accomplishing this purpose is mounted upon or associated with shaft 155 which is driven from the shaft 35 by means of a pinion 156 and gear 157.

The shaft 155 and the arms 159 and 160 rigidly secured thereto rotate in synchronism with, and through angles corresponding to, or proportional to the angles of movement of, the sighting telescope. These arms, through electrical contacts and associated mechanism, control the rotation of a ground speed screw 161, Figures 3, 6 and 12 to cause said ground screw, through a follower 162 mounted thereon and having a depending pin 163 engaging the slotted arm 164, to control said arm 164 so that it moves substantially in synchronism with the arm 159 and therefore with the sighting telescope. The follower 162 has a forwardly extending arm which engages a suitable guide rod 169 as best shown in Figure 12. The control mechanism mounted on the shaft 155 controls the ground speed motor 170 and a control motor 171 (Fig. 3) to cause the same to maintain the ground screw 161 so operated as to maintain the swinging slotted arm 164 as nearly as possible in synchronism with the sighting telescope. The angle between the slotted arm 164 and a line at right angles to the ground screw is equal to or proportional to the complement of the angle of depression. It follows that when this condition is being maintained the speed of rotation of the ground screw is proportional to the ground speed of the aircraft. To determine the actual ground speed the altitude must be considered. The ground speed may be indicated on the ground speed dial 15 by means of a suitably designed mechanism controlled by the ground speed screw or its driving gearing.

The gearing connecting the ground speed motor 170 and the ground speed screw 161, is best shown in Figures 3, 6, 8 and 13 and 18. The motor shaft carries a disk 175 which drives an opposed parallel disk 176 through a friction ball 177 adjustably positioned therebetween. The ground speed motor disk 175 is preferably recessed at the center so that when the friction ball 177 is positioned at the center by its controlling mechanism, there will be no wear on the friction ball. A train of gears 179, 180, 181 and 182 drives a friction disk 183. The disk 183 through a friction ball 185 adjustable to positions corresponding to different altitudes drives two friction rolls 186, 187, which friction rolls are geared to the ground speed screw 161 through the train of gears 189.

The position of the friction ball 177 between the disks 175 and 176 is controlled by means of a control screw 190 driven from the control motor 171 through the gears 191 and 192. The control mechanism comprises a follower nut 193, Figures 6 and 18 engaging the screw 190 and secured to the rod 194 carrying a controlling bracket 195 in which the ball 177 is rotatably mounted. The motor 171 is automatically controlled by means of the control mechanism mounted on the vertical shaft 155 hereafter to be described, to maintain the ball 177 as nearly as possible in such position that the speed of rotation of the ground speed screw 161 will be such that the follower slide nut 162 will travel at that speed which will swing the slotted follower arm 164 as nearly as possible at the same speed as the swing of the arm 159 and shaft 155 and of the telescope.

The friction ball 185 is controlled by a hand adjustment and set to correspond to the altitude of the aircraft. This hand setting mechanism is best shown in Figures 6, 8 and 18. The hand crank 21, Figure 2, is secured to a short shaft 200, which is arranged for clutch engagement with a vertical shaft 201, Figure 6, alined therewith and which, through bevel gears 202, 203, drives a horizontal screw shaft 204, Figure 18, which screw shaft is threaded into a sleeve shaft 205 carrying a guide 206 which controls the position of the friction ball 185. In order to indicate the extent of the correction, a pinion 207, Figure 5, secured to the shaft 200 beneath the top face plate of the machine engages a gear 208 carrying a pinion 209 which in turn engages a gear 210 secured to the shaft 211 which carries the altitude indicating disk 17, Figure 2.

Ground speed and control motors

The electrical motor control mechanism is best shown in Figure 12.

As above mentioned, arms 159 and 160 are rigidly mounted on shaft 155, Figure 12, which shaft is controlled by the sight. Slotted arm 164 and arm 165 rigidly connected thereto by means of a sleeve are motor driven through ground speed screw 161 and associated mechanism, the driving motor and connecting gearing being so controlled that the arms 164 and 165 are normally driven in synchronism with the arms 159 and 160. When small differences in the angular positions of the arms of the two sets occur, due either to the movement of the control arms or the overrunning or lagging of the follower arms, the control motor is suitably actuated through one set of contacts. When large differences in the angular positions occur another set of contacts operate to cause a high speed operation of the control motor and reversal, if necessary, of the ground speed motor as well as of the control motor.

The arm 159 carries depending therefrom a block 225 which lies between two swinging arms 226 and 227. The outer ends of these arms carry respectively electrical contacts 228 and 229 serving as feeler devices positioned upon opposite sides of an insulating block 230 carrying contacts 231, 232. The contacts 228 and 229 are adjustable. The arms 226 and 227 are rotatably mounted on shaft 155 but are insulated from said shaft and from each other, arm 226 being bent to avoid interference with a supporting bracket. They are separated a predetermined distance by the insulating block 225 and the contacts 228 and 229 are so adjusted that only one thereof may contact at a time with the cooperating contacts 231, 232. When the contact 228 engages contact 231 a circuit is closed which causes the control motor to rotate in one direction and when the contact 229 engages contact 231, another circuit closes to reverse the motor. By this means, if the arm 164 under control of the ground speed screw 161 is traveling faster than the arm 159, the described circuits will cause the control motor to move the friction ball 177 toward the center of the driving disk 175 to effect a slower rotation of the ground screw, whereas if the arm 164 is moving too slowly, the friction ball 177 will be moved in the opposite direction. By this arrangement the arm 164 is caused to move synchronously with the arm 159, or is maintained in step therewith.

The two arms 226, 227 are normally pressed toward each other and the interposed insulating block 225 by means of two spiral springs 235, 236 secured to the respective arms and to pins mounted in a block of insulating material 237 rotatably mounted upon the shaft 155.

When the sighting telescope is moved more rapidly, as for example, in the event of sighting on a new target, the slotted arm 164 would swing too slowly under the control mechanism thus far described, for satisfactory results. It is therefore desirable to provide means for driving the control motor more rapidly. Also it is necessary to reverse the ground speed motor when the direction of movement of the telescope is reversed. This is accomplished by mechanism shown in Figures 12, 19, 20 and 21. The arm 160 heretofore mentioned as secured to the shaft 155 carries at one end an insulating block 250 and carries at its opposite end a rotatably mounted bracket 251, and insulated therefrom a sliding rod 252, pivotally connected to a collar 254 rotatably mounted on but insulated from the shaft 155. The collar 254 carries two arms 255 and 256 having contacts 257, 258 on their outer ends adapted to engage contacts 259, 260 respectively. These parts constitute a snap switch adapted to close one of two circuits to cause the reversal of both the ground speed motor and the control motor as will be hereinafter more particularly described. In the arrangement shown, when the ground speed motor is reversed the control motor should also be reversed for obvious reasons. Upon excessive rotation, for example through an arc of 10°, of the arm 160 carrying the insulation block 250 in a clockwise direction, Figures 19 and 20 the contact 257 will snap into engagement with the contact 259 if not already in engagement therewith. The block 250 will engage the arm 263 pivoted on but insulated from the shaft 155 and swing the same in a clockwise direction until an adjustable contact 264 carried at the outer end thereof engages an arm 265 pivotally mounted at 266 upon a disk 267 of insulating material. The disk 267 serves to support conductor members for several electrical circuits and is held to rotate with arm 165 through pin 166 engaging a slot in depending arm 167 on the disk. The engagement of contacts 264, 265 together with other control devices which act simultaneously will cause the motors to swing the arms 164, 165 and disk 267 rapidly in the same clockwise direction thus following the movements of the block 250.

When the motor actuated arm 164 and associated parts overrun the synchronized position by a small amount the control motor will be reversed by engagement of contacts 229 and 231 of arms 227 and 164. Ordinarily during the time that the sight is trained continuously on a target, while flying toward the target, the first set of contacts afford sufficient control and the high speed circuit is not closed. When raising the sighting telescope quickly as when sighting on a new target after dropping one bomb the above described operation obtains.

When the arm 164 so actuated and with it arm 165 and disk 267, again approaches a position in synchronism with arms 159 and 169 then the parts approach the relative positions shown in Figure 19. This relative counter-clockwise movement of arm 160 will, first, separate contacts 264, 265, second, separate contacts 228, 231, third close contacts 229, 230, and fourth, cause a contact 270 carried by an arm 271 to approach and contact with arm 272 pivoted at 273 to the insulating disk 267. If the relative motion in the same direction continues through an arc of about 10° after engagement of the contact 270 with arm 272, then the snap switch will operate to engage contacts 258, 260 to reverse the ground speed motor and the control motor. The engagement of either the contacts 264 or 265 with 270 or 272 causes the control motor to operate at high speed by actuating a high speed relay 455, Figure 26, introducing resistance in the control motor circuit. A spring 269 holds the arms 263 and 271 normally toward each other. The electrical connections are shown diagrammatically in Figure 26 and will be hereinafter further explained.

The effect of the two mechanisms just described and shown in Figures 12, 19, 20 and 21 is to maintain the rotation of the ground screw at such a speed that as nearly as possible it will cause the slotted arm 164 to swing at the same speed as the arm 159 and its shaft 155 which in turn is moved as nearly as possible in synchronism with the sighting telescope by means of the motors 36 and 37 as above described.

*Target bearing indicator for obscured target*

It sometimes occurs that the target becomes obscured as for example by a cloud or a smoke screen during the approach to the target. Under such conditions it is desirable to provide means whereby the bomb may be dropped under control other than that of the sighting telescope.

This can be accomplished in the apparatus illustrated if the ground speed motor and control motor can be operated to continue the actuation of the ground speed screw at the speed of operation which has already been established during the approach while the target was in view, if means can be provided for causing release of the bomb when the craft has traveled a distance which would bring it over the target.

In Figure 27 is shown an arrangement whereby the telescope can be in effect disconnected from the apparatus and the ground speed screw can be continuously driven at the already established speed. In operation when the target becomes obscured the control motor is stopped by a suitable switch thus causing the established gearing ratio between the ground speed motor and ground speed screw to be maintained and therefore causing the ground speed screw to continue to be driven at the same speed at which it was operating at the time the telescope was disconnected. Suitable switches are also provided to insure continuing operation of the ground speed motor in the forward direction regardless of the movement of the telescope. As shown, a third hand 12' is provided over the dial 10, this hand being controlled from the ground speed screw 161 to indicate the target bearing, that is to say the angle of depression which the telescope would indicate if it were pointed at the target. The hand 12' is provided with an electrical contact member 12" which when the hand comes into registration with the range angle indicating hand 11 will close the circuit to cause a bomb to be dropped. The closing of this contact will operate to drop the bomb just as the closing of the contact 11' between the hands 11 and 12 would cause a dropping of the bomb if the telescope sight were in operation.

Suitable hand control switches may be provided for connecting either the depression angle indicating hand 12 or the target bearing indicating hand 12' to control the bomb dropping circuit. If the telescope is in operation following the target, then the switches will be arranged to provide a bomb dropping circuit controlled by the hand 12, whereas, if the telescope is not so operating the bomb dropping circuit through the hand 12' will be put in operation.

The mechanism shown in Figure 27 is in the main the same as that of Figure 12 previously described and the parts which are the same as in the first described structure will be indicated mainly by the same reference characters. Some parts which are substantially the same as in the previously described mechanism will be indicated by the corresponding numbers primed. In the arrangement shown in Figure 27, the shaft 35' is made hollow and a shaft 35" extends through the center thereof and carries at its upper end the target bearing indicating hand 12'. At its lower end this shaft is provided with a gear 156' which meshes with and is driven by a gear 157' on a shaft 155". Inasmuch as it is desired to connect the hand 12' so that it will be actuated in synchronism with the arm 164, it is desirable to connect the shaft 155" to this arm to rotate therewith. In the arrangement illustrated the shaft 155" projects into the shaft 155' which is made hollow for this purpose and a connection between the inner shaft 155" and the arm 164 is made by means of a pin extending through a slot in the sleeve shaft 155'. Sufficient relative movement between the shaft 155" and the sleeve shaft 155' can be provided by this arrangement since the maximum relative movement is not excessive.

The arm 159' is pinned to an extension of the sleeve shaft 155' so that the gear 157 is rigidly connected thereby through the shaft 155' just as, in the construction shown in Figure 12, the arm 159 and the gear 157 were both rigidly connected to the shaft 155. The remaining mechanism is the same as shown in Figure 12 and need not be further described or shown in the drawings.

The described arrangement, including the target bearing indicating hand, is useful either when the target is temporarily obscured or when the observer desires to use the telescope for observing something other than the target to be bombed. It provides means whereby a bomb can be dropped at a predetermined time during flight in an established course combined with means for determining the time at which the bomb should be dropped to reach a target observed for a relatively brief period.

The arrangement shown is merely illustrative. It is preferable to provide the additional hand 12' instead of arranging the hand 12 to be automatically controlled from the ground speed screw but this is not essential.

The operation of the motor control mechanism is as follows. The direction of rotation of the control motor 171 is reversed whenever the circuits through the contacts 228, 229, 231, 232 change. If, however, the swing of the shaft 155 is so rapid that the control motor as controlled by these circuits does not affect a sufficiently rapid change, the high speed relay control mechanism shown in Figure 19 operates and causes the control motor to be driven at a higher rate or speed. The snap switch 254 shown in Figure 19 and above described effects reversal of the ground speed motor 170 when necessary. The electrical connections are carried by the insulation disk 267 and thereon are mounted slip rings 275 to 279 which are engaged by brushes 280 to 284 which are carried on a support 285.

In order to stop the ground speed motor when the slide 162 carried by the ground speed screw reaches either end of its travel, I provide circuit breakers 290, 291, the latter of which is shown in Figure 10 and indicated in the electrical diagram, Figure 26. These circuit breakers are connected in the circuit of the motor and as best shown in Figure 12, each circuit breaker has a spring pressed pivoted arm 293 which when engaged by the slide 162 is moved to break contact between terminals 294 at the opposite end thereof. Similar circuit breakers 295, 296, Figure 18, are provided at the opposite ends of the speed control screw 190 to stop the control motor 171, when the friction ball 177 is carried to either limit of its travel. The circuits are such that the operation of a circuit breaker opens a circuit to stop operation of the motor for drive toward that circuit breaker but does not interfere with the closing of the motor circuit for drive in the opposite direction.

It will be clear from the above description that the speed of rotation of the ground screw 161 is proportional to the rate of change of the cotangent of the angle of depression and therefore proportional to the ground speed of the craft, but in calculating the ground speed the altitude must also be taken into account. As above explained the friction ball 185 is adjusted radially of the driving disk 183 to a position corresponding to the altitude. This adjustment is so proportioned that the speed of rotation of the driving disk 183, when the sighting telescope is continuously trained upon the target, will be proportional to the ground speed of the aircraft whatever the altitude. The ground speed indicating pointer is therefore connected to be controlled by the speed of rotation of this disk. The connections are best shown in Figures 3, 8, 13 and 18. A gear 300 is secured to the counter shaft carrying the pinion 181 and this gear 300 meshes with a gear 301 on a horizontal shaft 302. A high speed shaft 303 parallel to shaft 302 is driven therefrom through a gear 304 and pinion 305. This high speed shaft carries a centrifugal governor 307 having a collar 308 which receives a pin 309 projecting from an arm 310 secured to the lower end of the spindle 92 to which the ground speed indicating pointer 16 is secured. The arm 310 is preferably adjustably mounted upon the spindle 92.

It will be obvious that except at such times as the sighting telescope is being moved from one target or object to another, the spindle 92 and its pointer 16 will be controlled by the centrifugal device to indicate the actual ground speed of the aircraft.

*Follow-up motor*

The follow-up motor 65 (Fig. 6) has hereinbefore been mentioned as controlled by the ground speed indicating mechanism and more particularly by the ground speed indicating spindle 92. Any suitable control for causing the ground speed cams to be actuated in accordance with the rotative position of the ground speed indicator may be employed. That selected for description herein is more particularly shown in Figures 3, 8 and 13. The gear 91 is made of insulating material and carries upon its under face contact rings 320 which are engaged by fixed contacts 322, and on its upper face suitable circuit closers controlled by a cam 325 (Fig. 3) fixed to spindle 92. When the gear 91, as driven by the follow-up motor, lags behind or leads the spindle 92, the cam closes one circuit or the other to drive the follow-up motor in the appropriate direction.

The cam 325 is designed to hold both circuits broken, but when the spindle 92 rotates in either direction relative to the gear 91, one contact is immediately closed, starting the follow-up motor and causing this motor to continue to drive until the gear 91 and the spindle 92 are again in synchronism. By this arrangement synchronism between the gear 91 and spindle 92 and therefore between the calculating mechanism and the ground speed indicator mechanism is maintained. It is to be noted that the motor 171, termed the follow-up motor for convenience, supplies the power for operating the calculating mechanism and acts as a relay device avoiding strain on the driving mechanism of the ground speed devices.

*Drift, air speed and terminal velocity*

The range angle, as above noted, is affected by the resistance of the air to movement of the bomb during its fall in the direction of the travel of the craft. This is calculated by the apparatus illustrated from the factors, air speed, angle of drift, and terminal velocity, in which the air speed is taken as the speed of the machine with respect to the air in the direction in which the aircraft is headed.

The effect of the resistance of the air to movement of the bomb in the direction of actual travel of the craft will, of course, depend upon the air speed multiplied by the cosine of the angle of drift. If the angle of drift is zero, the air resistance will have maximum effect. The amount of correction to be made on account of air resistance will depend also upon the type of bomb as regards the resistance of the air to its movement. The terminal velocity is a factor depending upon the character of the bomb in this respect. Accordingly, the terminal velocity is taken into account in making the correction.

In the apparatus shown, provision is made for setting the calculating mechanism by hand to correspond to the air speed and terminal velocity of the bomb. The angle of drift is indicated by mechanism controlled automatically from the drift indicator C carried elsewhere in the aircraft. The terminal velocity crank 26, Figures 2, 10 and 14, is carried on a shaft having at its lower end a pinion 350 which through idler 351 drives gear 360 secured to the shaft carrying the terminal velocity indicating dial 24. The gear 360 meshes with and drives a pinion 361, Figure 10, of a differential mechanism 362. A pinion 363 fixed on the terminal velocity indicating shaft with gear 360 engages a gear 364, Figure 3, on shaft 142 to adjust ground speed cam 57 as above explained through the eccentric 141, Figure 22.

Setting for air speed is made by means of the crank 29 on a shaft having at its lower end a pinion 366 which, through idler 367 drives the gear 370 secured to the shaft carrying the air speed indicating dial 27. The gear 370 in turn drives the pinion 371 of said differential mechanism 362. The differential mechanism is connected to and drives the shaft 375, Figure 14, to the lower end of which a spiral face cam 380 is secured.

The correction for drift as above explained is made by mechanism under the control of the drift angle indicator C, Figure 1. This mechanism is best shown in Figures 3, 6, 10, 14, 15 and 16. Two repeaters R—3'' controlled by transmitter T—3 drive gear 389 through pinions 387, 388, Figure 15. Two drift motors of smaller capacity are here used instead of one motor of greater capacity, but obviously this is merely optional with the designer. A pinion 390 secured to gear 389 in turn drives a gear segment 391 secured to the slotted arm 392. This control is such that the arm 392 is maintained always in a position at an angle equal to or proportional to the angle of drift as indicated by the drift indicator C previously mentioned. The spiral face cam 380 and the slotted arm 392, Figures 15 and 16, cooperate to control the position of a follower 395 which in turn by engagement with a slotted arm 396, moves a carriage 397 horizontally on ways 398. This carriage as best shown in Figure 11 carries a rack 400 having teeth downwardly presented to engage the gear segment 401 secured rigidly to a larger gear sector 402 which meshes with the pinion 403 on the shaft 79 of the ground speed cam control shown in Figure 4.

The carriage 397 is made of substantial length and provided with rollers 399 to reduce friction and prevent binding on the ways.

The follower member 395 has pins extending upwardly into the cam groove 381 and downwardly into the slot of the swinging drift arm 392. Rotation of the cam 380 in response to adjustment for terminal velocity and air speed will move the follower correspondingly radially for the desired correction. The amount of the correction to be made for air speed as affected by the terminal velocity varies as the cosine of the angle of drift. This element is introduced into the calculation by the swinging drift arm 392. The correction is not exact because the cam groove 381 is not the arc of a perfect circle but the inaccuracy involved due to the departure of the curvature from a true arc is negligible and the accuracy obtained is within the limits accepted as satisfactory in the design of the illustrated apparatus. Obviously the accuracy could be increased by increasing the number of turns of the spiral and correspondingly changing the associated gearing.

The correction for air speed as affected by terminal velocity and the angle of drift is carried into the resultant calculation by the mechanism above described through its connection to the ground speed cam 57. The mechanism causes an additional partial rotation to the cam 57 in one direction or the other independently of the drive of said cam from the follow-up motor 65. It would not follow ordinarily that additional rotation of this cam would make a true correction but it was found in the calculation of the various curves representing the effect of the factors involved, that sufficient similarity exists between the curve controlling the design of cam 57 and the correction curve to make it possible to obtain the required accuracy by this method.

The face cam 380 and the associated gearing are so designed that the additional rotation given to the ground speed cam 57 for each setting of the terminal velocity and air speed dials will in all cases be sufficient to make the necessary correction in the final calculated range angle. It will be noted that only one of the ground speed cams is adjusted by this mechanism and that the effect transmitted to the follower 52, Figure 4, will depend upon the setting of the altitude bridge.

If the drift calculating mechanism is in any way thrown out of synchronism, it can be adjusted manually by a mechanism provided for that purpose. Hand crank 32 is secured to a shaft 411 which carries on its lower end a pinion 412, Figure 15, meshing with a long gear 413 which in turn drives a gear 414 slidably mounted upon a stud shaft 415. The shaft 411 is slidable in its bearings and normally held in its uppermost position by a spring 416. The pinion 414 is normally held in its lower-most position by a lever 417 and a spring 418' connected thereto. By this arrangement the gear 414 is normally out of mesh with, but by manually depressing the drift adjusting handle 32, it can be moved into mesh with a gear 418 secured to the shaft of one of the drift motors R—3". Inasmuch as the two drift motors are in fact geared together, both will be simultaneously adjusted.

In order that the angle of drift may be indicated on the face of the calculator the rotatable dial 30 is secured to the upper end of shaft 420 and connected to be rotated in unison with the arm 392 as best shown in Figures 3 and 14. A gear 421 secured to the lower end of this shaft is driven from a similar gear 422 secured to the shaft which carries the drift arm 392 by means of an idler gear 423 loose on the shaft 424 which carries also gears 389 and 390. Stop pins 426, inserted in gear 422, are positioned to engage the frame of the machine to prevent excessive rotation of the drift angle slotted arm 392.

The depression angle repeater R—2' can be adjusted by hand when necessary by means of hand crank 428, Figures 2 and 7 and connecting gearing 429 which is similar to crank 410 and the associated gearing for adjusting the drift mechanism.

*Electrical connections*

A suitable arrangement of electrical connections for the calculator illustrated is shown diagrammatically in Figure 26.

A series of terminals 450 to 462 are indicated at the right of said figure for connection with circuits extending to the sight cradle, drift indicator, stable base and a battery or the like.

The two drift angle repeaters R—3" are similarly connected inasmuch as these repeaters act together simply to give more power than would be supplied by one repeater of the type used. These repeaters are suitably connected to the transmitter T—3 associated with the drift angle indicator to be actuated in synchronism therewith.

The depression angle repeaters R—2' and R—5 are connected to the depression angle transmitter T—2 of the observer's sight cradle A and to the depression angle transmitter T—5 of the stable base D to operate in synchronism therewith.

The terminals 461 and 462 indicated as positive and negative respectively are connected to a suitable battery or generator to supply current for the motors, etc. of the calculator mechanism. The ground speed motor 170 is shunt wound, the armature circuit being closed and reversed under control of a relay 450 actuated through connection with the snap switch 254, Figure 19. The relay switch is of the normally open type but is energized by current through the snap switch 254 and therefore normally is driven in one direction or the other. The circuit breakers 290, 291 positioned one at each end of the ground speed screw are connected in the control circuits and act through the relay 450 to open the circuit when the follower 162 reaches either limit of its travel.

The control motor 171 is shunt wound. The armature circuit is closed and reversed by a normally open relay switch 451 controlled by contact carrying arms 226, 227 shown in Figures 12 and 25 and previously described. Circuit breakers 295, 296 are positioned one at each end of the speed control screw 190 and act through the relay 451 to open the armature circuit when the speed control follower 193 approaches either limit of its travel. A second relay 452 actuated by the snap switch 254 is interposed in the control circuit of relay 451. This latter relay rectifies the control for the reversal of the telescope movement. The object of this relay may be explained as follows: When approaching a target with the sighting telescope trained continuously on the target, the arm 227 leads, and the arm 226 follows the slotted arm 164. If the follower arm 164 as controlled by the motors and driving mechanism lags in its following movement, then the arm 226 closes a circuit to increase the effective driving speed. If it leads then the arm 227 closes a circuit to decrease the effective driving speed. When the ground speed screw is actuated in the reverse direction, however, the arm 226 leads and the arm 227 follows. It is therefore necessary that the circuit closed through the arm 227 should act to increase the driving speed and the circuit closed through the arm 226 should act to decrease the driving speed. This is accomplished by the reversing relay 452 above mentioned.

Theory of the calculator

As above explained, the plot shown in Figure 28 represents the range angles for various altitudes, ground speeds, air speeds, and terminal velocities of bombs dropped, plotted as logarithmic curves. In the plot the ordinates correspond substantially to the logarithms of the altitudes and the abscissae correspond to the logarithms of the range angles as expressed in degrees for the conditions indicated. The reference scales are modified sufficiently so that the several plot lines are substantially straight instead of curved as would be the case if the plot were truly logarithmic.

In said figure, the heavier lines represent plots for the various ground speeds indicated with an assumed air speed of 125 miles per hour and an assumed terminal velocity of 1200 feet per second. In order to indicate the effect of variation of air speed, similar lines are plotted, indicating the range angles for different air speeds but for the same terminal velocities and ground speeds as in the first set of lines. A few of these lines are indicated as dotted lines in the plot. In order to indicate the effect of different terminal velocities, similar lines shown as dot and dash lines are plotted for the same ground speeds as the principal lines above indicated and for air speeds of 125 miles an hour but with various terminal velocities varying from 1000 to 1600 feet per second. The ground speed, air speed, and terminal velocity are indicated on the plot in a manner that is believed to be clear without further explanation. For example, the line indicated by the reference letter $x$ is a plot of the range angle for various altitudes when the ground speed is 50 f. p. s., the air speed 100 f. p. s. and the T. V. of the bomb to be dropped 1200 f. p. s. Upon examination of the plot it will be noted that the several lines are divided into groups and the lines of each group substantially converge so as to approach each other toward the bottom of the plot. The horizontal line D—D is selected as indicating where the lines approach each other closely enough so that the line may be used as defining a point of convergence for each group without introducing an error beyond the limits of accuracy prescribed for the machine.

The several lines of the plot are nearly straight lines, and all may be treated as such without introducing too great an inaccuracy in the results to be obtained by the device.

Figure 29 represents diagrammatically a complete plot for graphically calculating the range angle for all conditions within certain predetermined limits, the calculation being made in accordance with the previously mentioned formula $G(Tv+Lt)-(UoLt+La)$.

A portion of the diagram is a reproduction in part of Figure 28. The ordinates for the several altitudes are marked to indicate the corresponding altitudes in feet and the corresponding range angles in degrees. For convenience in reading also, conversion curves are shown and suitably labeled on the plots in order that the different altitudes and range angles may be read more accurately. Along the horizontal line corresponding to an altitude of 20,000 feet are plotted the range angles for ground speeds of 50, 100, 150 feet, etc. per second, assuming the fall to be in air, with a bomb having a terminal velocity of 2,000 feet per second; that is to say, representing the portion of the formula $G(Tv+Lt)$. For convenience in finding the range angle for 20,000 feet altitude corresponding to various ground speeds, there is developed upon the plot a conversion curve which is designated as "upper drum curve" for the reason that it is the curve on the basis of which the upper drum or cam 57 is designed as will be hereinafter explained. For the purposes of developing this conversion curve the ground speeds between 50 and 300 are laid off at the right on Scale M, the lines for different ground speeds being uniformly spaced. These ground speed indications are marked 50, 100, 150 etc. Similarly, we plot along the line indicating an altitude of 2,000 feet, the $G(Tv+Lt)$ values for the same ground speeds, that is to say, 50, 100, 150 feet per second, etc. For reasons that will hereafter appear, it is preferable to find the corresponding points on the line O—O corresponding to the points already plotted on the 20,000 and 2,000 altitude lines. These values are indicated as 50, 100, 150, etc. on line O—O. For convenience in reading and for other purposes the conversion curve is next developed which is designated "lower drum curve" and is the curve on the basis of which the lower drum or cam 56 is designed. For this conversion curve the ground speed values 50, 100, 150 etc. are indicated at the right on Scale N equally spaced.

It is now possible by means of the conversion curve to find the point on the line O—O corresponding to any ground speed between the limits 50 and 300. In view of what has already been said it will be understood that straight lines may be drawn between the points marked 50, 100, etc. on the 20,000 feet altitude line and the corresponding points on the line O—O and these lines will be plot lines for $G(Tv+Lt)$ values for all altitudes within the limits indicated.

We will now consider the trail corrections for air speed, and terminal velocities. Sufficiently accurate results are obtained if the corrections are made as for the 20,000 feet altitude and the values 50, 100, etc. along the line O—O are used without correction. This follows from the fact that the several lines for different air speeds and terminal velocities but the same ground speed substantially meet on the line O—O as above noted. Now it has been found that the trail correction for varying terminal velocities and for varying air speeds bears a certain relation to the effect of a change of ground speed such that if the effect of a certain increase of air speed, or of a certain decrease of terminal velocity, has in the case of a ground speed of 200 feet per second, the same effect as a decrease of 25 feet per second in the ground speed then at other ground speeds as for example at 100 the same increase of air speed or the same decrease of terminal velocity will still have the same effect as a decrease of 25 feet per second of the ground speed. In view of this fact it is possible to develop conversion curves whereby in effect certain amounts are added to or subtracted from the actual ground speed, to make the correction for air speed and terminal velocity, thus giving an empirical ground speed figure which is then used in calculating the range angle from the upper drum conversion curve. This conversion curve may also be considered as corresponding to the $(UoLt+La)$ value of the formula. Such a conversion curve is shown at the right in Figure 29. In said conversion curve the curve is drawn for terminal velocities of from 2000 to 1000 feet per second. This curve is laid out with an assumed air speed of 80 miles per hour. Just beneath this plot is shown a scale divided to indicate 80, 90, 100, etc. miles per hour.

Now the effect of differences of terminal velocity is similar to the effect of differences of air speed in such manner that one conversion curve can be used for both corrections if suitable scales are used. The point marked 2000 on the plot gives the correction for 80 miles per hour and 2000 feet per second terminal velocity. If the air speed scale marked 80, 90 . . . 140 is substituted for the terminal velocity scale under the conversion curve with the point marked 80 positioned where the point marked 2000 is shown, then the curve would give us immediately corrections for the several air speeds indicated but all at a terminal velocity of 2000. It follows that to obtain the correction for any combination of terminal velocity and air speed the corresponding scale lengths for terminal velocity and for air speed should be added and measured along the base line and then the corresponding vector between said base line and the conversion curve taken as the correction factor. For example, if the correction for 130 miles per hour air speed and terminal velocity of 1600 is desired then the distance between the marks 80 and 130 is laid off to the right of the point marked 1600 on the base line of the conversion curve. As a matter of fact the point thus obtained happens to substantially coincide with the mark indicated 1200. The vertical vector between the point 1200 and the conversion curve is the correction desired. This curve forms the basis for the design of spiral cam 380, which controls the additional rotation of upper drum 57.

It is now desirable to provide for a further correction which may be termed the correction for time lag. This correction is graphically indicated by the plot marked "Time Lag Correction" in Figure 29. This correction is found to be of such a character that it can satisfactorily be applied by moving the upper end of the plot line along the 20,000 ft. altitude line, whatever be the ground speed. The position of the upper drum conversion curve as shown on the plot is such that the time lag correction should be made by moving the upper end of the plot line under consideration to the right an amount equal to the vector between the base line and the conversion curve for the terminal velocity under consideration. This correction is effected in the calculator by eccentric 141 shown in Figure 22, which shifts bodily the upper drum 57.

The 20,000 ft. altitude line corresponds in the calculator to the position of the upper drum or cam 57 and the line O—O similarly corresponds to the position of the lower drum or cam 56.

For the purpose of illustrating the application of the diagram of Figure 29, a calculation of a range angle for illustrative conditions will be described. Let us assume flight without lateral drift at a ground speed of 150 feet per second and an air speed of 125 miles per hour with a bomb of 1200 feet per second terminal velocity to be dropped from an altitude of 8000 feet upon a stationary target at sea level. To find the position of the upper end of the plot line which is to correspond to the position of the ground speed bridge on the upper drum line or what is the same thing, to 20,000 feet altitude line, we take with dividers a distance on the air speed scale between the point 80 and the point 125 (interpolated) and lay this off along the scale of terminal velocities on the base of the $UoLt+La$ conversion curve to the right from the point marked 1200. From the resulting point, for convenience marked $h$, we establish the perpendicular to the conversion curve and measuring this vector which is our correction for the given settings, with the dividers lay it off vertically upward from the point 150 on Scale M for 150 feet per second and then establish from this point $k$ a horizontal line intersecting the upper drum curve at $l$. In the event of lateral drift this vector should be multiplied by the cosine of the angle of drift. From the point $l$ a vertical line is drawn to $m$ on the 20,000 feet altitude line. The selection of the point 150 is the equivalent of rotating the upper drum six complete turns if, as in the calculator shown, the drums are designed on the basis of one revolution for each 25 feet per second change of speed. The laying off of the additional vertical distance 150—$k$ is the equivalent of giving the upper drum an additional rotation of approximately one turn. In the calculator illustrated this correction is effected by means of the cam 380 and the associated mechanism.

To make the correction for time lag, we take the vector between the base and the curve on the 1200 line of the time lag correction curve and lay it off to the right from the point $m$ obtaining the point $n$. This correction corresponds to the adjustment of the eccentric 141. A straight line is now drawn from the point $n$ to the point 150 on the lower drum line O—O. This line represents the position of the ground speed bridge 51, Figure 4, in the calculator.

To obtain the range angle for an altitude of 8000, we draw a horizontal line from the point 8000 on the altitude scale to a point of intersection $p$ with the ground speed bridge line and establish a vertical line to the range angle conversion curve and by means of a horizontal line from the point of intersection $g$ to the range angle scale read the range angle. In this case we find a range angle of about 21½°. In the calculator the horizontal line 8000—$p$ represents the position of the altitude bridge 50 and vertical line $p$—$g$ represents the position of the follower bridge 54. The range angle conversion curve and scale are replaced by the cam arm 48 and the range angle indicating hand 11 and associated mechanism.

*Plot mechanically reproduced*

As already indicated the plot of Figure 29 is reproduced in the mechanical apparatus shown in the drawings and especially by that shown in Figure 4. The ground speed bridge 51 is movable laterally to position to represent the plot line for any set of conditions within the limits of the device. The lower end of the bridge is moved under the control of the cam 56, the position of the cam corresponding to that of the line O—O, along which the several plot lines of each group approach sufficiently near to a common center so that they can be treated as converging to such point. The upper end of the bridge is moved under the control of cam 57, the position of the cam corresponding to a line representing an elevation of 20,000 feet. The two cams are designed to mechanically accomplish the function of the corresponding conversion curves. When rotated to positions corresponding to any ground speed, they will carry the ground speed bridge to the corresponding position. In the apparatus shown, the cams are so designed that one rotation of each cam corresponds to a difference of ground speed of 25 feet per second and moves the bridge accordingly.

When calculating the range angle, graphically by means of the diagram of Figure 29, the position of the upper end of the plot line is determined in part through use of the $UoLt+La$ conversion curve for air speed and terminal velocity as above explained. In the mechanical calculator the upper end of the ground speed bridge is shifted by terminal velocity and air speed cranks 26 and 29 through suitable mechanism including cam 380 which is designed from the $UoLt+La$ conversion curve as a basis. This mechanism operates to give an independent correction rotation to the upper cam 57 through the differential mechanism 78 thus mechanically performing the step graphically performed as hereinbefore described by stepping off the correction vector at 150—k, Figure 29.

The true trail correction, of course, actually affects the path of the bomb in the direction of the axis of the plane. This correction may be treated for convenience as divided into two components, one in the direction of the line of flight relative to the ground and one at a right angle thereto. The first component affects the range angle. The second component makes it desirable to fly correspondingly to one side of the target as explained in my co-pending application above mentioned.

It is obviously desirable therefore to make a correction for the angle of drift. Now the component of the trail correction which affects the range angle varies as the cosine of the angle of drift for obvious reasons. It is therefore obvious that the amount of corrective rotation given to the upper ground speed cam 57 to correct for terminal velocity and air speed should in the event of a substantial drift be multiplied by the cosine of the angle of drift. This is accomplished mechanically in the construction illustrated by means of the apparatus shown in Figures 14 and 16 wherein the slide 397 instead of being controlled solely by the amount of rotation of the cam 380 is affected by the control of the swinging arm 392 in a manner to in effect multiply the correction by the cosine of the angle of drift when the arm 392 is swung from central position through an angle corresponding to the angle of drift.

The time lag correction is introduced by moving the upper cam 57 bodily in accordance with the time lag correction curve. A sufficiently accurate approximation to this correction can be obtained in the mechanism illustrated by means of the eccentric 141 arranged to have its maximum movement through an angle of 45° from the oblique position for a terminal velocity of 1000 feet per second to the extreme left position for a terminal velocity of 2000 feet per second.

The mechanisms for positioning the ground speed bridge for existing conditions of ground speed, air speed, drift and the terminal velocity have now been described and it is understood that the ground speed bridge represents a plot line for the stated conditions. The next step is to read the range angle for the particular altitude under consideration. To do this one selects a point on the bridge which corresponds to the given altitude. This selection is simulated mechanically, in the apparatus shown in the drawings, by means of an altitude bridge 50 shown in Figure 4 which bridge is moved by means of the crank 22, screws 115 and 116 and connections, to a position corresponding to the position indicated on the plot for the altitude under consideration. Inasmuch as the ordinates are substantially logarithmic the movement given to the bridge 50 must correspond. In the arrangement shown this is effected by so graduating the dial 18 as to indicate, for the various altitudes, when the correct movement has been given to the bridge. The bombardier as he rotates the crank 22 to move the altitude bridge watches the dial. A follower 52 is controlled by the ground speed bridge 51 and the altitude bridge 50.

Upon study of the plot and of the mechanism, it is found that the horizontal position of the follower for different ground speeds and for different altitudes varies substantially as the inverse tangent of the corresponding range angle. In the device shown advantage is taken of this fact and the cam arm 48 is arranged to be swung by the lateral movement of the follower 52. As shown a vertical follower bridge 54 is controlled by the follower 52 and carries a roller 55 which bears against the arm 48. The ratio, however, of the inverse tangents to the bridge position is not exact and it becomes desirable to provide a correction in order that the arm 48 may be swung by the lateral movement of the bridge through an angle corresponding exactly to the range angle in all cases. This is accomplished in the arrangement shown by the design of the cam face of arm 48. This arm is connected with indicator mechanism to permit direct reading of the range angle. The follower bridge mechanically serves the function of the vertical line drawn in the plot from the intersection of the selected altitude line and the plat line. The cam arm 48 and the range angle indicator hand and connecting mechanism perform the function of the range angle conversion curve of the plot.

The range angle is thus indicated on the bombardier's instrument. The angle of depression of the telescope is also indicated on the same dial as above explained and electrical connections for dropping a bomb when the two angles correspond may be provided if desired.

The additional target bearing indicating hand 12' is driven independently of the depression angle indicating hand to provide means for dropping a bomb after a predetermined interval under certain conditions as heretofore explained.

Mechanical operation

The operation of the apparatus has been explained in connection with the description thereof. It will be reviewed as follows:

When starting flight toward a target to be bombed, as soon as the craft has been started on its course toward the target the several dials and indicators are set to correspond to the conditions obtaining. The two altitude dials are set by means of the cranks 21 and 22 until they both indicate the elevation of the craft above the target. The crank 21 adjusts the position of the ball 185, Figures 3, 13 and 18 between the disk 183 and the rolls 186 and 187 so that the gearing ratio will bear a predetermined relation to the altitude. The crank 22 adjusts the altitude bridge 50, Figures 4 and 8, to a position corresponding to the altitude. For high altitudes the bridge is positioned toward the top of Figure 4. The setting for terminal velocity and air speed made by means of the cranks 26 and 29 adjusts the spiral face cam 380, Figures 3, 14 and 17, through the differential gearing on shaft 375. Simultaneous adjustment of the eccentric 141, Figures 4 and 22 is effected through shaft 142 and the gearing connections to bodily shift the cam 57 thereby to make a correction corresponding to the terminal velocity which correction is mechanically independent of the correction made through the spiral face cam 380. The adjustment of the drift angle indicator C, Figure 1, operating through the several transmitters and repeaters, correspondingly adjusts the sight cradle A, the stable base D, the drift indicator 31 on the calculator and, through the control mechanism best shown in Figures 14 and 16, adjusts the position of the swinging arm 392 to an angle corresponding to the angle of drift. The slide 397, Figure 16, is controlled by the spiral cam 380 and the swinging arm 392, cooperating with each other. This slide 397 in turn through the segments 401, 402, Figure 11, and the connections to shaft 79, Figure 4, actuates the differential mechanism 78 to suitably rotate the cam 57 to adjust for the air speed and terminal velocity. In this description it is assumed that the drift indicating mechanism of the calculator has been synchronized with the drift indicator C by means of the crank 32 and that the depression angle indicating hand 12 has been synchronized with the sighting telescope by means of the crank 428 and associated mechanism before starting flight.

With the adjustments made as above indicated, the telescope is trained upon the target and is maintained so trained preferably until the bomb is actually dropped. The lateral movement of the telescope controls the pilot's director B to indicate deviations and to enable the pilot to maintain accurately the desired course of flight. The movement of the sighting telescope in a vertical plane controls the depression angle indicating hand 12 to indicate always the angle of depression through the transmitter and repeater connections indicated in Figures 3 and 7 and elsewhere. The vertical movement of the telescope also controls shafts 35 and 155, Figures 3 and 12 thereby causing the arms 159 and 160, Figure 12, to constantly maintain a position corresponding to the angle of depression. In order to ascertain the ground speed and for other purposes, a ground speed screw 161 is driven at a speed which bears a predetermined ratio to the rate of change of the tangent of the angle of depression or, what amounts to the same thing, to the rate of change of the tangent of the angular position of the arms 159 and 160. This is accomplished through a ground speed screw motor 170, Figures 3 and 18 and associated gearing connecting it to the ground speed screw 161 and also by means of a cooperating speed control motor 171, Figure 3, which latter motor controls the position of the speed-ratio-changing friction ball 177. Relatively swinging arms carrying suitable electric contacts, best shown in Figures 12, 19, 20, 21, 25, automatically control the motor circuits to cause the rotation of the ground speed screw to be maintained as nearly as possible at the correct proportional speed. By this means, and in view of the adjustment of the gearing to correspond to the altitude, as previously explained, the speed of the driving gearing provides a means whereby the ground speed of the craft can be calculated and indicated upon a suitable dial. The ground speed indicating dial is shown in Figure 2. It is controlled by means of a governor mechanism shown in Figure 13 which in turn is driven from the gearing which drives the ground speed screw.

The ground speed is an important factor in computing the range angle. The range angle calculating mechanism is for the most part shown in Figure 4. This mechanism comprises ground speed cams 56 and 57 which are actuated by a follow-up motor 65, this motor being in turn controlled by the ground speed indicating mechanism, part of which is shown in Figure 13. As shown, the spindle 92 of the indicating mechanism and a gear 91 which is driven by gearing connections from the ground speed cam 56 so as to maintain a position always corresponding to the position of said cam, carry electrical connections whereby the circuits of the follow-up motor 65 are intermittently closed to cause said motor to maintain the ground speed cams always in suitable position under control of the speed indicating device. These cams 56 and 57 control the position of the ground speed bridge 51 which cooperates with the altitude bridge 50 to control by means of a follower 52 a bridge 54 carrying a roller 55 which swings an arm 48. It will be remembered that the corrections for air speed, terminal velocity and drift previously discussed, effect the position of the cam 57 and the adjustment for altitude controls the position of the bridge 50. The position of the arm 48 therefore always bears a certain relation to the range angle. This arm is suitably geared to the range angle indicating hand 11, Figures 2 and 3, to indicate the range angle to the bombardier. When the depression angle indicator hand 12 coincides with the range angle indicating hand 11, the electrical connection is made through the contact 11' to cause a dropping of the bomb. If the telescope is not in operation at the time the target bearing indicating hand 12' Figure 27, will through the electrical contact 12" close a circuit to cause dropping of the bomb.

I claim:

1. In a range angle calculating apparatus, in combination, a guide laterally adjustable to different positions to correspond to various altitudes, a slide on said guide, a movable sight arranged to be trained continuously upon a target, a motor for moving said slide along said guide, means automatically controlled by the movement of the sight for controlling said motor.

2. In a range angle calculating apparatus, in combination, a guide laterally adjustable to different positions to correspond to various altitudes, a slide thereon, a device movable to correspond to the movement of the line of sight to the target, a motor and gearing for moving said slide on said guide and means for controlling said motor and gearing to maintain the slide in a position corresponding to the rate of change of the tangent of the angle of the line of sight as indicated by said movable device.

3. In a range angle calculating apparatus, in combination, a pair of cams, a follower controlled by each cam, a guide extending between the followers and controlled thereby, a slide adjustable to different positions along the guide to correspond to different altitudes and a range angle indicator and means to connect the slide and range angle indicator.

4. In a range angle calculating apparatus, in combination, two slides movable in parallel paths, a cam controlling each slide, a speed indicator, means for driving both cams under control of the speed indicator, a bridge controlled by said slides, a slide adjustable along said bridge, a range angle indicator, and operative connections between the slide and the range angle indicator whereby the former controls the latter.

5. In a range angle calculating apparatus, in combination, two slides movable in parallel paths, a cam controlling each slide, a speed indicator, means for rotating both cams under control of the speed indicator, means for giving additional rotation to one of said cams, a bridge controlled by said slides, a slide adjustable along said bridge, a range angle indicator, and operative connections between the slide and the range angle indicator whereby the former controls the latter.

6. In a range angle calculating apparatus, in combination, two slides movable in parallel paths, a cam controlling each slide, a speed indicator, means for driving both cams under control of the speed indicator, means for giving additional movement to one of said cams, a bridge controlled by said slides, a slide adjustable along said bridge, a range angle indicator, and operative connections between the slide and the range angle indicator whereby the former controls the latter.

7. In a range angle calculating apparatus, in combination, two slides movable in parallel paths, a cam controlling each slide, a speed indicator, means for rotating both cams under control of the speed indicator, means for giving a movement of translation to one of the said cams, a bridge controlled by said slides, a slide adjustable along said bridge, a range angle indicator, and operative connections between the slide and the range angle indicator whereby the former controls the latter.

8. In a range angle calculating apparatus, in combination, two slides movable in parallel paths, a cam controlling each slide, a speed indicator, means for driving both cams under control of the speed indicator, a bridge controlled by said slides, a slide adjustable along said bridge, a shaft, means for setting said shaft in position to correspond to a predetermined constant, a source of power, driving connections between said source of power and one cam, driving connections between said source of power and the other cam comprising a differential mechanism connecting on the one hand to the source of power and to said shaft to be actuated thereby and on the other hand to said cam to drive the same.

9. In a range angle calculating apparatus, in combination, a laterally adjustable guide, a slide thereon, means for controlling the position of the slide on the guide to correspond to the ground speed, means for giving an additional movement to said slide, and an indicator controlled by said slide.

10. In a range angle calculating apparatus, in combination, a guide laterally adjustable to different positions to correspond to various altitudes, a second guide extending transversely of the first guide and laterally adjustable to different positions to correspond to various ground speeds, means for giving an additional movement to the second of said guides.

11. In a range angle calculating apparatus, in combination, a guide laterally adjustable to different positions to correspond to various altitudes, a slide thereon, a device movable to correspond to the line of sight to the target, means including a motor and gearing for moving said slide on said guide, means for controlling said motor and gearing to maintain the slide in a position corresponding to the rate of change of the tangent of the angle of the line of sight, and means adjustable to correspond to modifying factors for giving an additional movement to said slide.

12. In a range angle calculating apparatus, means adjustable to different positions to correspond to different ground speeds, means associated therewith adjustable to different positions to correspond to different altitudes, a range angle indicator controlled by both said means jointly, means associated with the first mentioned means arranged to modify the operative effect thereof on the range angle indicator and comprising a cam and a follower movable thereby, a drift indicator and means automatically controlled thereby for modifying the effect of the cam in a degree proportional to the angle of drift.

13. In a range angle calculating apparatus, means adjustable to different positions to correspond to different ground speeds, means associated therewith adjustable to different positions to correspond to different altitudes, a movable sight arranged to be trained continuously on a target, means controlled thereby for automatically adjusting the first mentioned means to correspond to the ground speed, means adjustable to correspond to different altitudes and associated with the means for automatically adjusting the first mentioned means and effective to modify the automatic adjustment of the first mentioned means.

14. In apparatus of the character described, a movable sight arranged to be continuously trained upon a target, a pivoted arm movable in synchronism with said sight, means for moving the arm in synchronism with the sight, a slide, a motor arranged to move said slide and controlled by the pivoted arm, to maintain the slide in predetermined position relative to said arm, a calculator mechanism including a cam, means controlled by the rate of movement of said slide for actuating said cam.

15. In apparatus of the character described, a movable sight, arranged to be trained on a target, a slide, a motor, gearing connecting said motor and slide for actuating said slide, means whereby said motor and gearing are controlled by the movement of the sight to maintain the slide in a position always having a predetermined relation to the position of the movable sight, a speed indicator associated with said gearing, a calculator mechanism including a cam and means for actuating said cam controlled by the speed indicator.

16. In apparatus of the character described, a sight arranged to be continuously trained on a target, a movable member, a motor, gearing connecting the motor to said movable member to actuate the same and means responsive to movements of the sight automatically controlling said motor and gearing to cause the member to be actuated at a speed bearing a predetermined relation to the speed of the craft, a speed indicator associated with said gearing, range angle calculating mechanism comprising a cam and means controlled by the speed indicator for actuating said cam.

17. In apparatus of the character described, a movable sight, a movable member, a motor controlled by the movement of said sight, gearing connecting said motor and said movable member for actuating the latter and controlled in synchronism with the movement of the sight to maintain the movable member in positions having predetermined relation to the position of the sight, said gearing comprising a speed varying adjustable element, a control motor and means driven thereby for moving the adjustable element to vary the speed of transmission of movement from the first mentioned motor, and control circuits for said control motor controlled by the movement of the sight.

18. In apparatus of the character described, a swinging arm, a slide movable in predetermined relation to said arm, a screw for controlling the position of said slide, a motor, gearing connecting said motor to said screw to drive the latter, said gearing comprising an adjustable element for varying the speed of transmission and means for moving said adjustable element to predetermined positions corresponding to predetermined altitudes to vary the speed of drive of the screw.

19. In apparatus of the character described, a swinging arm, a slide movable in predetermined relation to said arm, a screw for controlling the position of said slide, a motor, gearing connecting said motor to said screw to drive the latter, said gearing comprising an adjustable element for varying the speed of transmission and means for moving said adjustable element to predetermined positions corresponding to predetermined altitudes to vary the speed of drive of the screw, said gearing comprising also a second adjustable element for varying the speed of transmission, a motor for moving said second adjustable element, and means for controlling the direction of rotation of said motor in accordance with the relative positions of said slide and swinging arm.

20. In apparatus of the character described, in combination, a movable sight, a movable element, electrical means operable to actuate the movable element at one speed when the sight moves at a speed less than a predetermined speed and at a greater speed when the sight moves at a speed greater than said predetermined speed.

21. In a calculating apparatus of the character described, in combination, means for effecting a range angle calculation comprising a spiral face cam, means for rotating said cam to a position corresponding to a given air speed, a follower engaging the spiral groove of said cam, a swinging arm pivoted adjacent the center of said cam, said arm being engaged by said follower, and means for swinging said arm in a plane parallel to the plane of said cam, to a position corresponding to a given angle of drift.

22. A calculating apparatus of the character described, comprising a spiral face cam, means adjustable for terminal velocity, means adjustable for air speed, a differential mechanism connected on the one hand to said terminal velocity and air speed means, and on the other hand to said cam to actuate the same, a swinging guide pivoted adjacent the center of said cam, means for swinging said guide through an angle corresponding to the angle of drift, a follower engaging said guide and said cam groove, and a slide controlled by said follower.

23. In range angle calculating apparatus of the character described, in combination, a range angle indicator, a spiral cam, means for setting said cam to correspond to a given constant, a guide pivotally mounted coaxial with said cam, means for positioning said guide to correspond to the angle of drift, and means actuated by said follower for moving the range angle indicator.

24. In a calculating apparatus of the character described, in combination, an arm movable from normal position corresponding to no drift in an arc corresponding to the angle of drift, a guide parallel to the normal position of said arm, a follower thereon, and connections between said arm and the follower to move the follower an amount corresponding to the change of the cosine of the angle of drift as the arm moves.

25. In apparatus of the character described, in combination, a pivoted sight arranged to be trained continuously on a target, a slide, means controlled by the movement of the sight for moving the slide at a rate of speed proportional to the rate of change of the cotangent of the angle of depression of the sight, a speed indicator, means associated with the first mentioned means for actuating the speed indicator, said means for moving the slide including means for adjusting the speed of said speed indicator actuating means in accordance with the altitude.

26. In apparatus of the character described, in combination, a pivoted sight arranged to be trained continuously on a target, a pivoted arm, means for moving the arm substantially in synchronism with the sight comprising a screw, a slide actuated thereby and connected to the arm, electrically controlled driving means for actuating said screw, means controlled by the movement of the pivoted sight for actuating the electrical control of the driving means.

27. In apparatus of the character described, in combination, a pivoted sight arranged to be trained continuously on a target, a pivoted arm, means for moving said pivoted arm in synchronism with the sight, a second pivoted arm, means for moving the second arm substantially in synchronism with the first mentioned arm comprising a screw, a slide actuated thereby and connected to the second arm, driving means for actuating said screw having electrical circuits arranged to be automatically closed selectively upon relative movement between the first and second arms, and a speed indicator actuated by the driving means.

28. In apparatus of the character described, in combination, a pivoted sight arranged to be trained continuously on a target, a pivoted arm, means for moving said pivoted arm in synchronism with the sight, a second pivoted arm, means for moving the second arm substantially in synchronism with the first mentioned arm comprising a screw, a slide actuated thereby and connected to the second arm, driving means for actuating said screw having electrical circuits arranged to be automatically closed selectively upon relative movement between the first and second arms, a speed indicator, means associated with the driving means for actuating the speed indicator, and means for adjusting the speed of said speed indicator actuating means in accordance with the altitude.

29. In apparatus of the character described, in combination, a pivoted sight arranged to be trained continuously on a target, a shaft, means for rotating the shaft in synchronism with the sight, a pivoted arm, means for moving the pivoted arm substantially in synchronism with the shaft comprising gearing, driving means for actuating said gearing having electrical circuits arranged to be automatically closed selectively upon relative movement between the shaft and arm, and a speed indicator actuated by the driving means.

30. In apparatus of the character described, in combination, a pivoted sight arranged to be trained continuously on a target, a pivoted arm, a motor controlled by the sight and connected to move the arm in synchronism with the sight, a second pivoted arm, means for moving the second arm substantially in synchronism with the first arm comprising a screw, a slide actuated thereby and connected to the second arm, electrically controlled driving means for actuating said screw, a speed indicator, means associated with the driving means for actuating the speed indicator and having an element adjustable for altitude and means for adjusting said element in accordance with the altitude.

31. In apparatus of the character described, in combination, a pivoted sight arranged to be trained continuously on a target, a pivoted arm, a motor controlled by the sight and connected to move the arm in synchronism with the sight, a second pivoted arm, means for moving the second arm substantially in synchronism with the first arm comprising a screw, a slide actuated thereby and connected to the second arm, driving means for actuating said screw having electrical circuits arranged to be automatically closed selectively upon relative movement between the first and second arms including a circuit for increasing the speed of operation under predetermined conditions, and a speed indicator actuated by the driving means.

32. In apparatus of the character described, in combination, a pivoted sight arranged to be trained continuously on a target, a pivoted arm, means for moving said pivoted arm in synchronism with the sight, a second pivoted arm, means for moving the second arm substantially in synchronism with the first arm comprising driving means and electrical circuits controlling the same, means for closing one control circuit when the second pivoted arm lags behind the first mentioned pivoted arm by a predetermined angle and means for closing another control circuit when the second pivoted arm lags behind the first mentioned pivoted arm by a greater predetermined angle for increasing the speed of operation of the second arm moving means and a speed indicating means associated with the arm moving means.

33. In apparatus of the character described, in combination, a pivoted sight arranged to be trained continuously on a target, a shaft, means for rotating said shaft in synchronism with the angular movement of said sight, an arm pivoted concentrically of said shaft and gearing means for actuating said pivoted arm to cause it to follow the rotative movements of said shaft, electrical circuits controlling the operation of said gearing means, and electrical contacts carried by said shaft and arm respectively, one pair of contacts being arranged to make contact when the relative angular movement between the shaft and arm exceeds a predetermined minimum to close a slow speed control circuit and another pair of contacts being arranged to make contact when the relative angular movement between the shaft and arm exceeds a predetermined greater angle to close a high speed control circuit.

34. In apparatus of the character described, in combination, a movable sight arranged to be trained continuously on a target, a shaft, means for rotating said shaft in synchronism with the angular movements of said sight, an arm pivoted concentrically of said shaft, gearing for actuating said pivoted arm to cause it to follow the rotative movements of said shaft, electric circuits controlling the operation of said gearing, two contact arms pivoted concentrically with said shaft, electric contacts carried by the second pivoted arm and positioned between the single contacts, and a connection between said two pivoted arms and said shaft whereby said arms are yieldably pressed toward each other and toward the intervening contacts, said contacts being so positioned and arranged that when the movement of the second pivoted arm lags relative to the rotation of the shaft, one pair of contacts will engage to close a circuit and when the arm leads relative to the rotation of the shaft, the other circuit will be closed.

35. In apparatus of the character described, in combination, a pivoted sight arranged to be trained continuously on a target, a shaft, means for rotating said shaft in synchronism with the angular movement of said sight, an arm pivoted concentrically of said shaft and gearing for actuating said pivoted arm to cause it to follow the rotative movements of said shaft, electrical circuits controlling the operation of said gearing, electric contacts carried by said shaft and arm respectively arranged to close a circuit to accelerate the movement of the arm when it lags behind the shaft in its angular movement, electrical contacts carried by said shaft and arm respectively arranged to close a circuit to retard the movement of the arm when it leads in its angular movement relative to the shaft, and electric contacts carried by said shaft and arm respectively arranged to close a circuit to accelerate the movement of the arm more rapidly when it lags behind the shaft in excess of a predetermined angle, in its angular movement relative to the shaft, and electrical contacts carried by said shaft and arm respectively arranged to close another circuit to reverse the movement of the arm when it leads in its angular movement relative to the shaft an amount exceeding a predetermined angle.

36. In apparatus of the character described, in combination, a pivoted sight arranged to be trained continuously on a target, a stable base arranged to maintain a constant position relative to the vertical independently of the pitching of the aircraft, a pivoted arm, means controlled by the sight and stable base for moving the pivoted arm in synchronism with the movement of the sight relative to the stable base, a speed indicator and means controlled by the movement of the arm to actuate the speed indicator to correspond to the rate of change of the cotangent of the angle of depression of the sight relative to the stable base.

37. In apparatus of the character described, in combination, a pivoted sight arranged to be trained continuously on a target, a stable base arranged to maintain the constant position relative to the vertical independently of the pitching of the aircraft, a pivoted arm, means controlled by the sight and stable base for moving the pivoted arm in synchronism with the movement of the sight relative to the stable base, a second pivoted arm, means for moving the second arm substantially in synchronism with the first arm comprising gearing, means for automatically increasing and decreasing the speed of drive of said gearing as the second arm lags behind or leads in its angular motion relative to the first arm.

38. In apparatus of the character described, in combination, a pivoted sight arranged to be trained continuously on a target, a stable base arranged to maintain a constant position relative to the vertical independently of the pitching of the aircraft, a pivoted arm, means controlled by the sight and stable base for moving the pivoted arm in synchronism with the movement of the sight relative to the stable base, a second pivoted arm, means for moving the second arm substantially in synchronism with the first arm comprising a screw, a slide actuated thereby and connected to said second arm, driving means for actuating said screw having electrical circuits arranged to be automatically closed selectively upon relative movement between the first and second arms, and a speed indicator actuated by the driving means.

39. In apparatus of the character described, in combination, a pivoted sight arranged to be trained continuously on a target, a stable base arranged to maintain a constant position relative to the vertical independently of the pitching of the aircraft, a pivoted arm, actuating means controlled by the sight and stable base to move the pivoted arm through an angle proportional to the angle of movement of the sight relative to the stable base, a second arm, means for moving the second arm substantially in synchronism with the first arm, comprising a screw, a slide actuated thereby and connected to the second arm, electrically controlled driving means for actuating said screw to move the second arm in synchronism with the first arm, a speed indicator, means associated with the driving means for actuating the speed indicator and means adjustable to correspond to the altitude for adjusting the speed of said speed indicator actuating means in accordance with the altitude.

40. In apparatus of the character described, in combination, a pivoted sight movable relative to the aircraft in a vertical plane, a stable base having an element movable relative to the aircraft in a vertical plane and maintaining said element always in fixed position relative to the horizontal plane, a rotatable shaft, a differential mechanism having a driving element connected to actuate said shaft and two driven elements, means controlled by the movement of the sight connected to drive one driven element of said differential mechanism, and means controlled by the movement of the stable base relative to the aircraft to drive the other driven element, a speed indicator, means controlled by the movement of the shaft to actuate said speed indicator to indicate a speed substantially proportional to the rate of change of the tangent of the angle of movement of the shaft.

41. In apparatus of the character described, in combination, a pivoted sight movable in a vertical plane relative to the aircraft, a stable base having an element movable in a vertical plane relative to the aircraft and maintaining said element always in fixed position relative to the horizontal plane, a rotatable shaft, a differential mechanism having a driving element connected to actuate said shaft and two driven elements, means controlled by the movement of the sight relative to the aircraft connected to drive one driven element and means controlled by the movement of the stable base relative to the aircraft to drive the other driven element, a speed indicator, means controlled by the movement of the shaft to actuate said speed indicator to indicate the speed proportional to the rate of change of the tangent of the angle of movement of the shaft, and means adjustable to correspond to the altitude for modifying the actuation of the speed indicator.

42. In a range angle calculating apparatus, in combination, a sighting element, a follower movable in synchronism with the sighting element and controlled thereby, a range angle indicator and means controlled by the follower for actuating the range angle indicator.

43. In apparatus of the character described, a movable sight, a follower member, a motor, means including a speed-varying element whereby the movement of said sight controls said motor to actuate the follower member, and a control motor arranged to govern the speed-varying element between the first mentioned motor and the follower member to determine the speed of movement of the follower member.

44. In apparatus of the character described, a sight, a follower member, variable speed gearing for actuating the follower member, a control motor controlled by the sight for governing the speed ratio of said variable speed gearing, and means controlled by the sight for automatically controlling said control motor.

45. In apparatus of the character described, in combination, a movable sight element, a stable base, a swinging arm and means controlled by the movable sight element and the stable base for maintaining said swinging arm in a position corresponding to the true angle of depression of the sight, and speed indicating means controlled by and in accordance with the rate of movement of the swinging arm.

46. In apparatus of the character described, in combination, a movable sight element, a stable base, a swinging arm and means controlled by the movable sight element and the stable base for maintaining said swinging arm in a position corresponding to the true angle of depression of the sight, speed indicating means actuated in accordance with the rate of change of the cotangent of the angular position of said arm, and range angle indicating means and means controlled by the speed indicating means for actuating said range angle indicating means.

47. In apparatus of the character described, in combination, a movable sight element, a swinging arm, means including a differential mechanism for actuating said arm, actuating connections between said sight element and differential mechanism, and a stable base also connected to actuate said differential mechanism.

48. In a range angle calculating apparatus of the character described, in combination, means adjustable to correspond to the line of sight toward a target, means for controlling the position of said first mentioned means to maintain it in synchronism with the line of sight, an element movable along a line corresponding to the ground, means controlled by the first mentioned means for actuating the said last mentioned element, means for measuring the speed of movement of said last mentioned element, and means controlled thereby for indicating the ground speed.

49. In a range angle calculating apparatus of the character described, in combination, means adjustable to correspond to the line of sight toward a target, means for controlling the position of said first mentioned means to maintain it in synchronism with the line of sight, stabilizing means also affecting the position of said first-mentioned means to make correction for movements of the craft, an element movable along a line corresponding to the ground, means controlled by the first mentioned means for actuating the said last mentioned element, means for measuring the speed of movement of said last mentioned element, and means controlled thereby for indicating the ground speed.

50. In a range angle calculating apparatus of the character described, in combination, a freely movable sight, a guide representing a horizontal line through the target in the plane of the line of flight, a follower and means controlled by the sight for moving said follower along said guide in a direction and at a speed corresponding to the speed of relative approach of the craft toward the target, means controlled by the movement of said follower to indicate the speed of the craft.

51. In a range angle calculating apparatus of the character described, in combination, a guide representing a horizontal line through the target in the plane of the line of flight, a follower and means for moving said follower along said guide in a direction and at a speed corresponding to the speed of relative approach of the craft toward the target, means controlled by the movement of said follower to indicate the speed of the craft, and means controllable in accordance with the altitude connected with said last named means and adjustable to modify the speed indicated in accordance with the altitude.

52. In a range angle calculating apparatus of the character described, in combination, calculating mechanism comprising a guide representing the horizontal line corresponding to the line of flight, a swinging device representing the line of sight between the craft and the target, a movable sight element and means controlled thereby for moving the swinging device in synchronism with the line of sight, a follower on said guide, means controlled by the swinging device for maintaining the follower in position corresponding to the position of the swinging device, and means controlled by the rate of movement of said follower for indicating the speed of the craft.

53. In apparatus of the character described, mechanism for calculating the speed of the craft comprising a freely pivoted sight, a guide representing a horizontal line through the target, a swinging arm pivoted laterally of said guide and extending transversely thereof, and means movable along the guide and controlled by the sight for controlling the position of said swinging arm to maintain it in position representing the line of sight between the craft and target.

54. In apparatus of the character described, in combination, mechanism for calculating the speed of the craft comprising a guide representing a horizontal line through the target, a swinging arm pivoted laterally of said guide and extending transversely thereof, means for controlling the position of said swinging arm to maintain it in position representing the line of sight between the craft and target, said means including a follower on said guide movable thereunder control of the swinging arm, and speed indicating means actuated under control of the movement of said follower.

55. In apparatus of the character described, in combination, a range angle indicating element, a depression angle indicating element arranged to show the relation between the angle of depression of the line of sight to the target and the range angle, a sight and connections between said sight and depression angle indicating element for actuating the latter, a target bearing indicating element and connections between said sight and target bearing indicating element for actuating the latter, said target bearing indicating element also being arranged to show the relation between the angle of depression of the line of sight to the target and the range angle and means for actuating said last-named element independently of the sight.

56. In apparatus of the character described, in combination, a sight, a movable element, means for actuating said movable element at a uniform speed over a range of speeds, means controlled by the movement of the sight for determining the speed of actuation of said movable element, and a target bearing indicator controlled by the movement of said movable element.

57. In apparatus of the character described, in combination, a sight arranged to be trained upon the target, a follower, a motor connected to actuate said follower, means controlled by said sight for determining the speed of movement of said follower as actuated by said motor, a target bearing indicator, means controlled by said follower for actuating said target bearing indicator, and means whereby the connection between the sight and the follower actuating mechanism can be disconnected to cause the follower to continue its movement at an established speed.

58. In apparatus arranged to be carried in an aircraft for use in dropping missiles on a target, the combination, with a sight of a pivoted arm moving in synchronism with the sight, a screw and nut and means actuated thereby for indicating the speed of the craft, means for maintaining the speed of the screw and nut in predetermined relation to the angular movement of the pivoted arm including a feeler mechanism comprising a part carried by the screw and nut and a second part carried by the pivoted arm and means for detecting difference in angular movement between said pivoted arm and said part carried by the screw and nut.

59. In apparatus of the character described, in combination, a pivoted sight arranged to be trained continuously on a target, a slide, a motor for actuating said slide and means controlling the actuation of the slide comprising feeler devices responsive to the swinging movement of the sight to cause the slide to be maintained in movement at a rate of speed proportional to the rate of change of the cotangent of the angle of depression of the sight.

60. In apparatus of the character described, in combination, a pivoted sight arranged to be trained continuously on a target, a slide, a screw for actuating said slide, means for actuating said screw, and means comprising feeler devices sensitive to movements of the pivoted sight to control the actuation of the actuating means to cause the slide to be moved at a rate proportional to the rate of change of the cotangent of the angle of depression of the sight.

61. In apparatus of the character described, in combination, a movable sight, a follower element, means including differential mechanism for actuating said follower element, actuating means controlled by the movement of the sight element for driving one element of said differential mechanism, a stable base and actuating means controlled thereby for driving another element of said differential mechanism.

62. In apparatus of the character described, in combination, a movable sight element, a stable base, a swinging arm and means controlled by the movable sight element and the stable base for maintaining said swinging arm in a position corresponding to the true angle of depression of the sight, speed indicating means and means controlled by the swinging arm to move at a speed corresponding to the rate of change of the cotangent of the angular position of said arm and connected to actuate the speed indicating means.

63. In apparatus of the character described, in combination, a range angle indicating element, a target bearing indicating element, a sight, means to actuate the target bearing indicating element at a uniform speed over a range of speeds, means responsive to movement of the sight to determine the speed of actuation of the target bearing indicating element, and means cooperating with said last mentioned means to set the range angle indicating element, the means to actuate the target bearing element comprising a motor arranged to continue in operation at a uniform speed independently of the movement of the sight.

64. In a range angle calculating apparatus, means adjustable to different positions to correspond to different ground speeds, means associated therewith adjustable to different positions to correspond to different altitudes, a movable sight arranged to be trained continuously upon a target and movable freely independently of both said means, and telemetric means including feeler devices responsive to the swinging movement of the sight controlled by the movable sight for automatically adjusting the first mentioned means but leaving the sight free to move unhampered by the telemetric means.

ALEXANDER PROCOFIEFF-SEVERSKY.